US010372214B1

(12) United States Patent
Gleeson et al.

(10) Patent No.: US 10,372,214 B1
(45) Date of Patent: Aug. 6, 2019

(54) ADAPTABLE USER-SELECTABLE INPUT AREA IN AN ELECTRONIC DEVICE

(71) Applicant: Apple Inc., Cupertino, CA (US)

(72) Inventors: Brian T. Gleeson, Cupertino, CA (US); Miao He, Cupertino, CA (US); Camille Moussette, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/350,592

(22) Filed: Nov. 14, 2016

Related U.S. Application Data

(60) Provisional application No. 62/384,688, filed on Sep. 7, 2016.

(51) Int. Cl.
*G06F 3/01* (2006.01)
*G06F 3/041* (2006.01)
*G06F 3/044* (2006.01)

(52) U.S. Cl.
CPC .............. *G06F 3/016* (2013.01); *G06F 3/044* (2013.01); *G06F 3/0412* (2013.01); *G06F 3/0416* (2013.01); *G06F 2203/04105* (2013.01)

(58) Field of Classification Search
CPC ........ G06F 3/016; G06F 3/044; G06F 3/0412; G06F 3/0416; G06F 2203/04105
See application file for complete search history.

(56) References Cited

U.S. PATENT DOCUMENTS

| 5,196,745 A | 3/1993 | Trumper et al. |
| 5,293,161 A | 3/1994 | MacDonald et al. |
| 5,424,756 A | 6/1995 | Ho et al. |
| 5,434,549 A | 7/1995 | Hirabayashi et al. |

(Continued)

FOREIGN PATENT DOCUMENTS

| CN | 101036105 | 9/2007 |
| CN | 101409164 | 4/2009 |

(Continued)

OTHER PUBLICATIONS

Nasser et al., "Preliminary Evaluation of a Shape-Memory Alloy Tactile Feedback Display," Advances in Robotics, Mechantronics, and Haptic Interfaces, ASME, DSC-vol. 49, pp. 73-80, 1993.

(Continued)

*Primary Examiner* — Brent D Castiaux
(74) *Attorney, Agent, or Firm* — Brownskin Hyatt Farber Schreck, LLP

(57) ABSTRACT

An electronic device can include one or more user-selectable input areas. The user-selectable input area(s) may be situated at any suitable location in an electronic device. For example, the user-selectable input area can be displayed on a touchscreen display, positioned below a portion of an enclosure of the electronic device, and/or associated with, or included in, an input device in the electronic device. A user input may be guided to a user-selectable input area by providing one or more types of feedback to the user. The feedback can be tactile feedback, auditory feedback, olfactory feedback, visual feedback, and combinations thereof. Additionally, in some situations, the boundary or active area of a user-selectable input area is adjusted and a user input that is detected in the adjusted active area is associated with the user-selectable input area.

18 Claims, 13 Drawing Sheets

(56) References Cited

U.S. PATENT DOCUMENTS

| | | |
|---|---|---|
| 5,436,622 A | 7/1995 | Gutman et al. |
| 5,668,423 A | 9/1997 | You et al. |
| 5,842,967 A | 1/1998 | Kroll |
| 5,739,759 A | 4/1998 | Nakazawa et al. |
| 6,084,319 A | 7/2000 | Kamata et al. |
| 6,342,880 B2 | 1/2002 | Rosenberg et al. |
| 6,373,465 B2 | 4/2002 | Jolly et al. |
| 6,388,789 B1 | 5/2002 | Bernstein |
| 6,438,393 B1 | 8/2002 | Surronen |
| 6,445,093 B1 | 9/2002 | Binnard |
| 6,493,612 B1 | 12/2002 | Bisset et al. |
| 6,693,622 B1 | 2/2004 | Shahoian et al. |
| 6,777,895 B2 | 8/2004 | Shimoda et al. |
| 6,822,635 B2 | 11/2004 | Shahoian |
| 6,864,877 B2 | 3/2005 | Braun et al. |
| 6,952,203 B2 | 10/2005 | Banerjee et al. |
| 6,988,414 B2 | 1/2006 | Ruhrig et al. |
| 7,068,168 B2 | 6/2006 | Girshovich et al. |
| 7,080,271 B2 | 7/2006 | Kardach et al. |
| 7,126,254 B2 | 10/2006 | Nanataki et al. |
| 7,130,664 B1 | 10/2006 | Williams |
| 7,196,688 B2 | 3/2007 | Shena et al. |
| 7,202,851 B2 | 4/2007 | Cunningham et al. |
| 7,234,379 B2 | 6/2007 | Claesson et al. |
| 7,253,350 B2 | 8/2007 | Noro et al. |
| 7,276,907 B2 | 10/2007 | Kitagawa et al. |
| 7,323,959 B2 | 1/2008 | Naka et al. |
| 7,339,572 B2 | 3/2008 | Schena |
| 7,355,305 B2 | 4/2008 | Nakamura et al. |
| 7,360,446 B2 | 4/2008 | Dai et al. |
| 7,370,289 B1 | 5/2008 | Ebert et al. |
| 7,392,066 B2 | 6/2008 | Hapamas |
| 7,423,631 B2 | 9/2008 | Shahoian et al. |
| 7,508,382 B2 | 3/2009 | Denoue et al. |
| 7,570,254 B2 | 8/2009 | Suzuki et al. |
| 7,656,388 B2 | 2/2010 | Schena et al. |
| 7,667,371 B2 | 2/2010 | Sadler et al. |
| 7,667,691 B2 | 2/2010 | Boss et al. |
| 7,675,414 B2 | 3/2010 | Ray |
| 7,710,397 B2 | 5/2010 | Krah et al. |
| 7,710,399 B2 | 5/2010 | Bruneau et al. |
| 7,741,938 B2 | 6/2010 | Kramlich |
| 7,755,605 B2 | 7/2010 | Daniel et al. |
| 7,798,982 B2 | 9/2010 | Zets et al. |
| 7,825,903 B2 | 11/2010 | Anastas et al. |
| 7,855,657 B2 | 12/2010 | Doemens et al. |
| 7,890,863 B2 | 2/2011 | Grant et al. |
| 7,893,922 B2 | 2/2011 | Klinghult et al. |
| 7,904,210 B2 | 3/2011 | Pfau et al. |
| 7,911,328 B2 | 3/2011 | Luden et al. |
| 7,919,945 B2 | 4/2011 | Houston et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,976,230 B2 | 7/2011 | Ryynanen et al. |
| 8,002,089 B2 | 8/2011 | Jasso et al. |
| 8,020,266 B2 | 9/2011 | Ulm et al. |
| 8,040,224 B2 | 10/2011 | Hwang |
| 8,053,688 B2 | 11/2011 | Conzola et al. |
| 8,063,892 B2 | 11/2011 | Shahoian |
| 8,081,156 B2 | 12/2011 | Ruettiger |
| 8,125,453 B2 | 2/2012 | Shahoian et al. |
| 8,154,537 B2 | 4/2012 | Olien et al. |
| 8,174,495 B2 | 5/2012 | Takashima et al. |
| 8,174,512 B2 | 5/2012 | Ramstein et al. |
| 8,169,402 B2 | 6/2012 | Shahoian et al. |
| 8,217,892 B2 | 7/2012 | Meadors |
| 8,217,910 B2 | 7/2012 | Stallings et al. |
| 8,232,494 B2 | 7/2012 | Purcocks |
| 8,248,386 B2 | 8/2012 | Harrison |
| 8,253,686 B2 | 8/2012 | Kyung |
| 8,262,480 B2 | 9/2012 | Cohen et al. |
| 8,265,292 B2 | 9/2012 | Leichter |
| 8,265,308 B2 | 9/2012 | Gitzinger et al. |
| 8,344,834 B2 | 1/2013 | Niiyama |
| 8,345,025 B2 | 1/2013 | Seibert et al. |
| 8,351,104 B2 | 1/2013 | Zaifrani et al. |
| 8,378,797 B2 | 2/2013 | Pance et al. |
| 8,378,965 B2 | 2/2013 | Gregorio et al. |
| 8,384,316 B2 | 2/2013 | Houston et al. |
| 8,390,218 B2 | 3/2013 | Houston et al. |
| 8,390,594 B2 | 3/2013 | Modarres et al. |
| 8,400,027 B2 | 3/2013 | Dong et al. |
| 8,405,618 B2 | 3/2013 | Colgate et al. |
| 8,421,609 B2 | 4/2013 | Kim et al. |
| 8,469,806 B2 | 6/2013 | Grant et al. |
| 8,471,690 B2 | 6/2013 | Hennig et al. |
| 8,493,177 B2 | 7/2013 | Flaherty et al. |
| 8,493,189 B2 | 7/2013 | Suzuki |
| 8,576,171 B2 | 11/2013 | Grant |
| 8,598,750 B2 | 12/2013 | Park |
| 8,598,972 B2 | 12/2013 | Cho et al. |
| 8,604,670 B2 | 12/2013 | Mahameed et al. |
| 8,605,141 B2 | 12/2013 | Dialameh et al. |
| 8,614,431 B2 | 12/2013 | Huppi et al. |
| 8,619,031 B2 | 12/2013 | Hayward |
| 8,624,448 B2 | 1/2014 | Kaiser et al. |
| 8,633,916 B2 | 1/2014 | Bernstein et al. |
| 8,639,485 B2 | 1/2014 | Connacher et al. |
| 8,648,829 B2 | 2/2014 | Shahoian et al. |
| 8,654,524 B2 | 2/2014 | Pance et al. |
| 8,681,130 B2 | 3/2014 | Adhikari |
| 8,717,151 B2 | 5/2014 | Forutanpour et al. |
| 8,730,182 B2 | 5/2014 | Modarres et al. |
| 8,749,495 B2 | 6/2014 | Grant et al. |
| 8,754,759 B2 | 6/2014 | Fadell et al. |
| 8,760,037 B2 | 6/2014 | Eshed et al. |
| 8,773,247 B2 | 7/2014 | Ullrich |
| 8,780,074 B2 | 7/2014 | Castillo et al. |
| 8,797,153 B2 | 8/2014 | Vanhelle et al. |
| 8,803,670 B2 | 8/2014 | Steckel et al. |
| 8,834,390 B2 | 9/2014 | Couvillon |
| 8,836,502 B2 | 9/2014 | Culbert et al. |
| 8,836,643 B2 | 9/2014 | Romera Joliff et al. |
| 8,867,757 B1 | 10/2014 | Ooi |
| 8,872,448 B2 | 10/2014 | Boldyrev et al. |
| 8,878,401 B2 | 11/2014 | Lee |
| 8,907,661 B2 | 12/2014 | Maier et al. |
| 8,976,139 B2 | 3/2015 | Koga et al. |
| 8,981,682 B2 | 3/2015 | Delson et al. |
| 8,987,951 B2 | 3/2015 | Park |
| 9,008,730 B2 | 4/2015 | Kim et al. |
| 9,024,738 B2 | 5/2015 | Van Schyndel et al. |
| 9,052,785 B2 | 6/2015 | Horie |
| 9,054,605 B2 | 6/2015 | Jung et al. |
| 9,058,077 B2 | 6/2015 | Lazaridis et al. |
| 9,086,727 B2 | 7/2015 | Tidemand et al. |
| 9,092,056 B2 | 7/2015 | Myers et al. |
| 9,104,285 B2 | 8/2015 | Colgate et al. |
| 9,122,330 B2 | 9/2015 | Bau et al. |
| 9,134,796 B2 | 9/2015 | Lemmons et al. |
| 9,172,669 B2 | 10/2015 | Swink et al. |
| 9,218,727 B2 | 12/2015 | Rothkopf et al. |
| 9,245,704 B2 | 1/2016 | Maharjan et al. |
| 9,256,287 B2 | 2/2016 | Shinozaki et al. |
| 9,274,601 B2 | 3/2016 | Faubert et al. |
| 9,280,205 B2 | 3/2016 | Rosenberg et al. |
| 9,286,907 B2 | 3/2016 | Yang et al. |
| 9,304,587 B2 | 4/2016 | Wright et al. |
| 9,319,150 B2 | 4/2016 | Peeler et al. |
| 9,361,018 B2 | 6/2016 | Pasquero et al. |
| 9,396,629 B1 | 7/2016 | Weber et al. |
| 9,430,042 B2 | 8/2016 | Levin |
| 9,436,280 B2 | 9/2016 | Tartz et al. |
| 9,442,570 B2 | 9/2016 | Slonneger |
| 9,448,713 B2 | 9/2016 | Cruz-Hernandez et al. |
| 9,449,476 B2 | 9/2016 | Lynn et al. |
| 9,466,783 B2 | 10/2016 | Olien et al. |
| 9,489,049 B2 | 11/2016 | Li |
| 9,496,777 B2 | 11/2016 | Jung |
| 9,501,149 B2 | 11/2016 | Burnbaum et al. |
| 9,557,857 B2 | 1/2017 | Schediwy |
| 9,829,981 B1 | 11/2017 | Ji |
| 9,875,625 B2 | 1/2018 | Khoshkava et al. |

(56) References Cited

U.S. PATENT DOCUMENTS

| | | |
|---|---|---|
| 9,904,393 B2 | 2/2018 | Frey et al. |
| 2003/0117132 A1 | 6/2003 | Klinghult |
| 2005/0036603 A1 | 2/2005 | Hughes |
| 2005/0230594 A1 | 10/2005 | Sato et al. |
| 2006/0017691 A1 | 1/2006 | Cruz-Hernandez et al. |
| 2006/0209037 A1 | 9/2006 | Wang et al. |
| 2006/0223547 A1 | 10/2006 | Chin et al. |
| 2006/0252463 A1 | 11/2006 | Liao |
| 2007/0106457 A1 | 5/2007 | Rosenberg |
| 2007/0152974 A1 | 7/2007 | Kim et al. |
| 2008/0062145 A1 | 3/2008 | Shahoian |
| 2008/0084384 A1 | 4/2008 | Gregorio et al. |
| 2008/0111791 A1 | 5/2008 | Nikittin |
| 2009/0085879 A1 | 4/2009 | Dai et al. |
| 2009/0115734 A1 | 5/2009 | Fredriksson et al. |
| 2009/0166098 A1 | 7/2009 | Sunder |
| 2009/0167702 A1 | 7/2009 | Nurmi |
| 2009/0167704 A1 | 7/2009 | Terlizzi et al. |
| 2009/0174672 A1 | 7/2009 | Schmidt |
| 2009/0207129 A1 | 8/2009 | Ullrich et al. |
| 2009/0225046 A1 | 9/2009 | Kim et al. |
| 2009/0231271 A1 | 9/2009 | Heubel et al. |
| 2009/0243404 A1 | 10/2009 | Kim et al. |
| 2009/0267892 A1 | 10/2009 | Faubert |
| 2009/0313542 A1 | 12/2009 | Cruz-Hernandez et al. |
| 2010/0116629 A1 | 5/2010 | Borissov et al. |
| 2010/0225600 A1 | 9/2010 | Dai et al. |
| 2010/0231508 A1 | 9/2010 | Cruz-Hernandez et al. |
| 2010/0313425 A1 | 12/2010 | Hawes |
| 2010/0328229 A1 | 12/2010 | Weber et al. |
| 2011/0115754 A1 | 5/2011 | Cruz-Hernandez |
| 2011/0128239 A1 | 6/2011 | Polyakov et al. |
| 2011/0132114 A1 | 6/2011 | Siotis |
| 2011/0205038 A1 | 8/2011 | Drouin et al. |
| 2011/0210834 A1 | 9/2011 | Pasquero et al. |
| 2011/0261021 A1 | 10/2011 | Modarres et al. |
| 2012/0038471 A1 | 2/2012 | Kim et al. |
| 2012/0056825 A1 | 3/2012 | Ramsay et al. |
| 2012/0062491 A1 | 3/2012 | Coni et al. |
| 2012/0113008 A1 | 5/2012 | Makinen et al. |
| 2012/0127071 A1 | 5/2012 | Jitkoff et al. |
| 2012/0127088 A1 | 5/2012 | Pance et al. |
| 2012/0223824 A1 | 9/2012 | Rothkopf |
| 2012/0235942 A1 | 9/2012 | Shahoian |
| 2012/0319827 A1 | 12/2012 | Pance et al. |
| 2012/0327006 A1 | 12/2012 | Israr et al. |
| 2013/0016042 A1 | 1/2013 | Makinen et al. |
| 2013/0044049 A1 | 2/2013 | Biggs et al. |
| 2013/0207793 A1 | 8/2013 | Weaber et al. |
| 2013/0253818 A1 | 9/2013 | Sanders et al. |
| 2013/0278401 A1 | 10/2013 | Flaherty et al. |
| 2014/0062948 A1 | 3/2014 | Lee et al. |
| 2014/0125470 A1 | 5/2014 | Rosenberg |
| 2014/0168175 A1 | 6/2014 | Mercea et al. |
| 2014/0218853 A1 | 8/2014 | Pance et al. |
| 2014/0274398 A1 | 9/2014 | Grant |
| 2014/0327630 A1* | 11/2014 | Burr .................. G06F 3/0488 345/173 |
| 2015/0097800 A1 | 4/2015 | Grant et al. |
| 2015/0116205 A1* | 4/2015 | Westerman ............ G06F 3/016 345/156 |
| 2015/0126070 A1 | 5/2015 | Candelore |
| 2015/0130730 A1 | 5/2015 | Harley et al. |
| 2015/0135121 A1 | 5/2015 | Peh et al. |
| 2015/0277562 A1 | 5/2015 | Bard et al. |
| 2015/0205357 A1 | 7/2015 | Virtanen et al. |
| 2015/0234493 A1 | 8/2015 | Parivar et al. |
| 2015/0293592 A1 | 10/2015 | Cheong et al. |
| 2015/0317026 A1* | 11/2015 | Choi .................. G06F 3/0416 345/660 |
| 2015/0338919 A1 | 11/2015 | Weber et al. |
| 2015/0349619 A1 | 12/2015 | Degner et al. |
| 2016/0011664 A1 | 1/2016 | Silvanto et al. |
| 2016/0098107 A1 | 4/2016 | Morrell et al. |
| 2016/0171767 A1 | 6/2016 | Anderson et al. |
| 2016/0209979 A1* | 7/2016 | Endo .................. G06F 3/0488 |
| 2016/0293829 A1 | 10/2016 | Maharjan et al. |
| 2016/0327911 A1 | 11/2016 | Eim et al. |
| 2016/0328930 A1 | 11/2016 | Weber et al. |
| 2016/0379776 A1 | 12/2016 | Oakley |
| 2017/0003744 A1 | 1/2017 | Bard et al. |
| 2017/0024010 A1 | 1/2017 | Weinraub |
| 2017/0249024 A1 | 8/2017 | Jackson et al. |
| 2017/0285843 A1 | 10/2017 | Roberts-Hoffman et al. |
| 2017/0337025 A1 | 11/2017 | Finnan et al. |
| 2018/0014096 A1 | 1/2018 | Miyoshi |
| 2018/0029078 A1 | 2/2018 | Park et al. |
| 2018/0181204 A1 | 6/2018 | Weinraub |
| 2018/0194229 A1 | 7/2018 | Wachinger |

FOREIGN PATENT DOCUMENTS

| | | |
|---|---|---|
| CN | 101663104 | 3/2010 |
| CN | 101872257 | 10/2010 |
| DE | 214030 | 3/1983 |
| EP | 1686776 | 8/2006 |
| EP | 2743798 | 6/2014 |
| JP | 2004129120 | 4/2004 |
| JP | 2004236202 | 8/2004 |
| JP | 2010537279 | 12/2010 |
| JP | 2010540320 | 12/2010 |
| KR | 20050033909 | 4/2005 |
| TW | 2010035805 | 10/2010 |
| WO | WO2002/073587 | 9/2002 |
| WO | WO2006/091494 | 8/2006 |
| WO | WO2007/049253 | 5/2007 |
| WO | WO2007/114631 | 10/2007 |
| WO | WO2009/038862 | 3/2009 |
| WO | WO2010/129892 | 11/2010 |
| WO | WO2013/169303 | 11/2013 |
| WO | WO2014/066516 | 5/2014 |
| WO | WO2016/091944 | 6/2016 |

OTHER PUBLICATIONS

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

Stein et al., "A process chain for integrating piezoelectric transducers into aluminum die castings to generate smart lightweight structures," Results in Physics 7, pp. 2534-2539, 2017.

Author Unknown, "3D Printed Mini Haptic Actuator," Autodesk, Inc., 16 pages, 2016.

\* cited by examiner

ADAPTABLE USER-SELECTABLE INPUT AREA IN AN ELECTRONIC DEVICE

CROSS-REFERENCE TO RELATED APPLICATION(S)

This application claims the benefit under 35 U.S.C. § 119(e) of U.S. Provisional Patent Application No. 62/384,688, filed on Sep. 7, 2016, and entitled "Adaptable User-Selectable Input Area in an Electronic Device," which is incorporated by reference as if fully disclosed herein.

FIELD

The described embodiments relate generally to an input device. More particularly, the present embodiments relate to an adaptable user-selectable input area and techniques for providing feedback to guide a user input to the adaptable user-selectable input area.

BACKGROUND

Many electronic devices include touch-based devices that receive user inputs. For example, a touchscreen display is typically used as a touch-based input component. The touchscreen display is capable of displaying various text and graphics to a user, which the user can select by touching the touchscreen. More specifically, a touchscreen can be configured to display virtual buttons, icons, textboxes, hyperlinks, and other types of user-selectable input elements. The user may select an input element by tapping the portion of the touchscreen where the input element is displayed.

However, without looking at the display, it can be difficult for a user to find the virtual buttons, icons, textboxes, or other user-selectable input elements that are being displayed. The smooth hard surface of the touchscreen does not provide any indication of the shape, size, or location of the virtual buttons, textboxes, icons, and other user-selectable input elements. But in some instances, it may be inconvenient, or even dangerous, for the user to look at the touchscreen display. For example, a user cannot look at the touchscreen display while driving a motor vehicle or operating other machinery. Alternatively, a user may not want to display information on the touchscreen display for security reasons. Additionally, it can be difficult for visually impaired users to interact with an electronic device using a touchscreen display.

SUMMARY

Embodiments described herein generally relate to guiding a user input (e.g., a touch or force input) to a user-selectable input element by providing one or more types of feedback to the user. The feedback can be tactile feedback, auditory feedback, olfactory feedback, visual feedback, and combinations thereof. The user-selectable input element may be situated at any suitable location in an electronic device. For example, the user-selectable input element can be displayed on a touchscreen display, positioned below a portion of an enclosure of the electronic device such as a side or back of the enclosure, and/or associated with an input or an input/output device coupled to, or included within, an electronic device (e.g., a trackpad, a physical button). Additionally, in some situations, the active area or boundary of a user-selectable input element can be adjusted and a user input that is detected in the adjusted active area may be associated with the user-selectable input element. As used herein, the terms "active area" and "adjusted active area" refer to a region in which a user input that is intended for a user-selectable input element is recognized and associated with the user-selectable input element.

In one aspect, an electronic device includes a touch-sensing layer positioned below an input surface of the electronic device, one or more feedback devices, and a processing device coupled to the touch-sensing layer and to the one or more feedback devices. The processing device is configured to adjust an active area of a user-selectable input area in response to the touch-sensing layer detecting a user input on the input surface that is outside of the user-selectable input area. The adjusted active area extends beyond the boundary of the user-selectable input area. The processing device is further configured to cause at least one feedback device to provide feedback to alert a user to the adjustment of the active area. Additionally or alternatively, the processing device is configured to cause at least one feedback device to provide feedback to guide the user input to the adjusted active area. The processing device is also configured to recognize the user input and associate the user input with the user-selectable input area when the user input is detected in at least a portion of the adjusted active area.

In another aspect, an electronic device includes multiple sensors that are each configured to detect touch events on a surface of the electronic device. A first subset of the sensors forms a user-selectable input element and a different second subset of the sensors forms an adjusted active area of the user-selectable input element. A processing device is coupled to the multiple sensors and configured to recognize the touch event and to associate the touch event with the input element when the touch event is detected by at least one sensor in the first or second subset of sensors.

In yet another aspect, a method of operating an electronic device includes detecting a user input on an input surface of the electronic device and determining if the user input is within an active area of an input element. In some embodiments, the active area comprises an area within a boundary of the input element. The active area is adjusted when the user input is not within the active area of the input element. A first feedback is provided to a user to alert a user to the adjustment of the active area. A second feedback is provided to guide the user input to the adjusted active area. The user input is recognized and associated with the input element when the user input is detected in the adjusted active area.

In another aspect, an electronic device includes a touch-sensing layer positioned below an input surface of the electronic device and configured to detect user inputs on the input surface. A processing device is coupled to the touch-sensing layer and to a feedback device. The processing device is configured to cause the feedback device to provide feedback to indicate a function associated with the user-selectable input area and associate a user input with the user-selectable input area when the user input is detected in the user-selectable input area.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
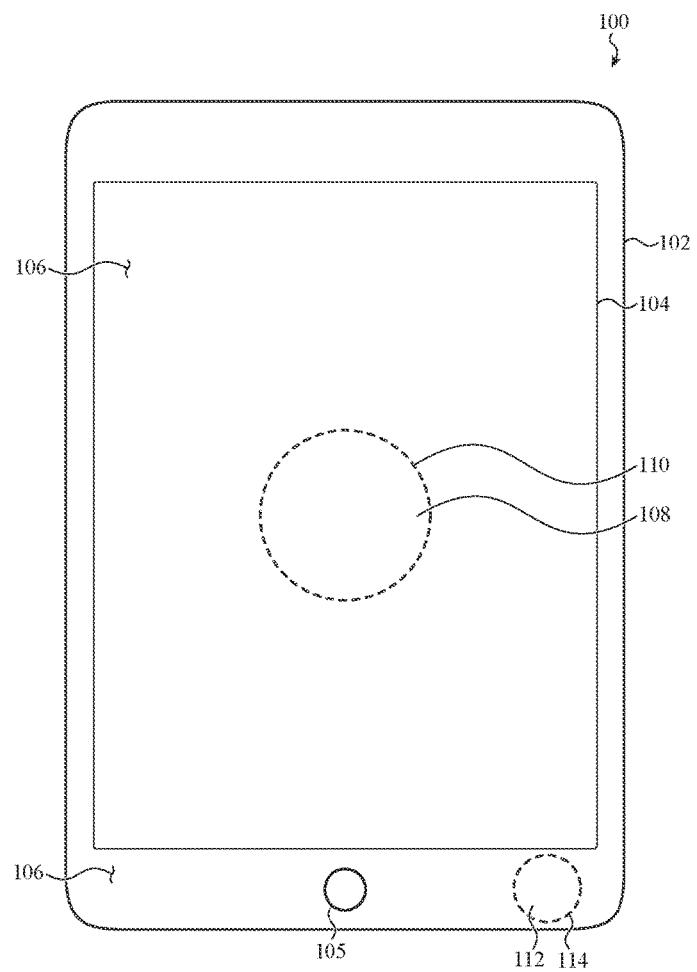
FIG. 1A depicts an example electronic device that has one or more user-selectable input areas.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to an electronic device that includes one or more user-selectable input areas or input elements. The user-selectable input area(s) may be situated at any suitable location in an electronic device. For example, a user-selectable input area can be displayed on a touchscreen (and/or force-sensitive) display, positioned below a portion of an enclosure of an electronic device, and/or included in an input or input/output device coupled to, or within, an electronic device (e.g., a trackpad, a physical input button). A touch event or user input, such as a touch or force input, may be guided to a user-selectable input area by providing one or more types of feedback to the user. This guiding or direction may be initiated by the touch or force input. The user input can be directed to a user-selectable input area in response to a user input occurring outside of a boundary of the user-selectable input area.

In an illustrative embodiment, an input/output device, such as headphones, may be coupled to a digital media player. One or more user-selectable input areas can be included in the headphones. For example, a user-selectable input area may be included in each ear pad (e.g., below the housing) of the headphones. The user-selectable input areas can receive user inputs that are used to control a function or application of the digital media player. For example, a user-selectable input area may receive a user input (e.g., a force input) to increase or decrease the volume of audio output or playback. In some embodiments, a user can press an input area to mute the audio output or playback.

Additionally or alternatively, feedback can be provided to alert a user to one or more locations of different input elements, to guide a user input to a user-selectable input element, and/or to alert a user to a distance to the user-selectable input element. For example, tactile feedback (e.g., haptic output) having a first set of characteristics (e.g., magnitude, duration, frequency) can be produced to alert a user to the locations of the next and previous input elements, and haptic output having a second set of characteristics can be provided to indicate to a user the location of a pause input element. In certain embodiments, haptic output having a third set of characteristics can be generated to guide a user input to a play input element or to indicate a proximity to the play input element.

In some embodiments, feedback can be provided in a section of the headphones other than where a user is touching or where the input elements are located. For example, haptic output can be produced around a perimeter of the ear pads to indicate what and/or where the user is touching. Alternatively, the haptic output can be provided in the headband to indicate the user is not touching an input element or to guide the user to an ear pad that includes the play input element.

In some embodiments, feedback may be provided proactively when a user is expected to provide a user input to the user-selectable input area. For example, an embodiment may expect, predict, anticipate, or otherwise contemplate that a user can be expected to apply a force (e.g., a press) to the user-selectable input area, for example, based on an application program running on the electronic device. A processing device can cause one or more feedback devices to provide feedback to alert the user and/or to guide the user input to the user-selectable input area.

Additionally or alternatively, in some situations, the boundary or active area of a user-selectable input area can be adjusted from a default state or size to an "adjusted active area" of a different size. In this fashion, a user input that is detected in the adjusted active area is recognized and associated with the user-selectable input area. As used herein, the terms "active area" and "adjusted active area" refer to a region in which a user input that is intended for a user-selectable input area is recognized and associated with the input area. In some embodiments, the active area corresponds to the area of the input area or element. In other embodiments, the active area may have a different size than the input element. For example, an active area may be larger than an input element so that user inputs that only partially contact the input element are recognized and associated with the input element. Alternatively, in some situations, an active area can be smaller than an input element to ensure a user input is intended and received by the input element.

In one representative embodiment, tactile feedback (e.g., haptic output) may be provided in a feedback area within the active area to guide a user input to the input area. Additionally or alternatively, two or more feedback areas can be created within the boundary of an input area and/or within an active area. When a user input is to be directed to the input area, haptic output can be provided in one or more of the feedback areas. For example, haptic output may only be produced in a first feedback area until the user input is at a first distance from the center of the user-selectable input area. Thereafter, the haptic output may be produced only in a second feedback area until the user input is at a closer second distance from the center of the input area. Finally, haptic output may be produced only in a third feedback area until the user input is within the input area.

Additionally or alternatively, in some embodiments, the haptic output can home in on a center or a boundary of the input area. By "home in," it is meant that the haptic output can appear to move toward the center or boundary from a different region; in some embodiments, the haptic output (or some characteristic of the haptic output) may vary with distance from the portion of the input area. Similarly, the haptic output can move inward from the boundary of a feedback area to the boundary of an adjacent feedback area to indicate to a user the direction a user input needs to move to reach the input area.

Additionally or alternatively, in some embodiments, the haptic output can be created throughout an entire feedback area. In other embodiments, the haptic output may be provided in one or more sections of a feedback area to guide a user input to a user-selectable input area.

In some embodiments, one or more feedback areas can be positioned outside of a user-selectable input area. In such embodiments, haptic output can be produced only when the touch input is moving in one direction. For example, haptic output can be provided only when the touch input is moving closer to the input area and no haptic output may be produced when the touch input is moving away from the input area.

Additionally, in some embodiments, one or more characteristics of the haptic output can differ between feedback areas. The characteristics of the haptic output include, but are not limited to, a frequency, a magnitude, and a duration. For example, the frequency of the haptic output can increase as the user input moves closer to a boundary of the user-selectable input area. Additionally or alternatively, the duration of the haptic output can decrease as the user input moves closer to (or away from) the boundary of the input area.

In certain embodiments, haptic feedback having one or more different characteristics can be produced to alert a user to a location of a user-selectable input element and/or to indicate a function associated with the input element (e.g., volume control, mute). Additionally or alternatively, the haptic output can indicate a location and a distance from a user-selectable input element. In other words, the haptic output can indicate or provide different data or information regarding a user-selectable input element.

Further, feedback other than tactile feedback (e.g., haptic output) can be used to direct a user input to a user-selectable input area. For example, audio feedback and/or visual feedback can be provided in addition to, or as an alternative to, the tactile feedback.

In some embodiments, the active area of a user-selectable input area can be adjusted to receive user inputs. The adjusted active area may be larger than the input area and surround the input area such that the entire input area is within the adjusted active area. Alternatively, an adjusted active area can include only a portion of an input area. For example, the active area can be expanded to include only half of an input area. A touch event can be recognized and associated with the input area when the touch event (or a portion of the touch event) is detected in the adjusted active area.

The active area can be adjusted based on several factors. A particular user may periodically or consistently submit user inputs (e.g., touch and/or force inputs) outside of the boundary of the input area. Once a sufficient number of such inputs is received, or when a sufficient number is received within a given time period, the active area may be expanded or moved to include the region in which the user submits his or her inputs. Additionally or alternatively, a processing device in the electronic device can receive output signals from one or more sensors that provide data on the orientation of the electronic device and/or the position of the input area on a display. The active area may be adjusted based on the orientation of the electronic device (e.g., landscape or portrait orientation) and/or the location of the input area in the electronic device. As yet another option, a user may create a user profile that specifies which active areas are to be adjusted. For example, the user can select different application programs in which an active area is to be adjusted.

As used herein, the terms "connected" and "coupled" are generally intended to be construed broadly to cover direct connections and indirect connections. In the context of the present invention, the terms "connected" and "coupled" are intended to cover circuits, components, and/or devices that are connected such that an electrical parameter passes from one to another. Example electrical parameters include, but are not limited to, voltages, currents, magnetic fields, control signals, and/or communication signals. Thus, the terms "coupled" and "connected" include circuits, components, and/or devices that are coupled directly together or through one or more intermediate circuits, components, and/or devices.

Additionally, in the context of the present invention, the terms "connected" and "coupled" are intended to cover mechanical or structural elements, components, and/or devices that are directly connected together or through one or more intervening elements, components, and/or devices.

These and other embodiments are discussed below with reference to FIGS. 1-10. However, those skilled in the art will readily appreciate that the detailed description given herein with respect to these Figures is for explanatory purposes only and should not be construed as limiting.

FIG. 1A shows an example electronic device that has one or more user-selectable input areas. In the illustrated embodiment, the electronic device 100 is implemented as a tablet computing device. Other embodiments can implement the electronic device differently. For example, an electronic device can be a smart phone, a laptop computer, a wearable computing device, a digital music player, a kiosk, a stand-alone touch screen display, headphones, a smart stylus, and other types of input, input/output, accessory, and/or electronic devices that have one or more user-selectable input areas.

The electronic device 100 includes an enclosure 102 at least partially surrounding a display 104 and one or more input/output (I/O) devices 105. The enclosure 102 can form an outer surface or partial outer surface for the internal components of the electronic device 100. The enclosure 102 can be formed of one or more components operably connected together, such as a front piece and a back piece. Alternatively, the enclosure 102 can be formed of a single piece operably connected to the display 104.

The display 104 can provide a visual output to the user. The display 104 can be implemented with any suitable technology, including, but not limited to, a liquid crystal display (LCD) element, a light emitting diode (LED) element, an organic light-emitting display (OLED) element, an organic electroluminescence (OEL) element, and the like.

In some embodiments, the I/O device 105 can take the form of a home button or input element, which may be a mechanical button, a soft button (e.g., a button that does not physically move but still accepts inputs), an icon or image on a display, and so on. Further, in some embodiments, the I/O device 105 can be integrated as part of a cover layer 106 and/or the enclosure 102 of the electronic device 100. Although not shown in FIG. 1, the electronic device 100 can include other types of I/O devices, such as a microphone, a speaker, a camera, a biometric sensor, and one or more ports, such as a network communication port and/or a power cord port.

The cover layer 106 may be positioned over the front surface (or a portion of the front surface) of the electronic device 100. At least a portion of the cover layer 106 can function as an input surface that receives user inputs (e.g., touch and/or force inputs). The cover layer 106 can be formed with any suitable material, such as glass, plastic, sapphire, or combinations thereof. In one embodiment, the cover layer 106 covers the display 104 and the I/O device 105. User inputs can be received by the portion of the cover layer 106 that covers the display 104 and by the portion of the cover layer 106 that covers the I/O device 105.

In another embodiment, the cover layer 106 covers the display 104 but not the I/O device 105. User inputs can be received by the portion of the cover layer 106 that covers the display 104. In some embodiments, the I/O device 105 may be disposed in an opening or aperture formed in the cover layer 106. In such embodiments, the aperture can extend through the enclosure 102 with one or more components of the I/O device 105 positioned in the enclosure.

In some embodiments, the display 104 can function as an input device that allows the user to interact with the electronic device 100. For example, the display 104 can be a multi-touch touchscreen LED display. A user-selectable input element or area 108 can be associated with the display 104. The user-selectable input area 108 may be a virtual input area that is displayed on the display 104 (e.g., an icon, a textbox, a button) and/or the user-selectable input area 108 may be a designated touch-sensing section of the display 104. In other words, the user-selectable input element 108 can be fixed in a location or can be positioned anywhere on the display 104.

In some embodiments, the user-selectable input area 108 has a boundary 110 that designates the dimensions of the user-selectable input area 108. The area within the boundary 110, or a portion of the area within the boundary 110, can be an active area that receives user inputs (e.g., touch and force inputs). A user can use a body part (e.g., a finger) or an object, such as a stylus, to submit user inputs to the user-selectable input area 108.

Although the user-selectable input area 108 and the boundary 110 are depicted as circular, in other embodiments the user-selectable input area 108 and/or the boundary 110 may have any given shape and/or dimensions. Additionally, FIG. 1 depicts only one user-selectable input area 108 on the display 104. Those skilled in the art will recognize that multiple user-selectable input areas can be displayed concurrently on the display 104.

Additionally or alternatively, a user-selectable input element or area 112 can be associated with the enclosure 102 (or one or more sections of the enclosure 102). Like the user-selectable input area 108, the user-selectable input area 112 has a boundary 114 that designates the dimensions of the user-selectable input area 112. The area within the boundary 114, or a portion of the area within the boundary 114, can be an active area that receives user inputs (e.g., touch and force inputs). Although the user-selectable input area 112 and the boundary 114 are depicted as circular, in other embodiments the user-selectable input area 112 and/or the boundary 114 may have any given shape and/or dimensions. Additionally, the user-selectable input area 112 may be one of multiple user-selectable input areas.

In some embodiments, one or more user-selectable input areas can be associated with, or incorporated into, other components of an electronic device. Example components include, but are not limited to, the I/O device 105, a trackpad, a physical input button, and a section or portion of the enclosure 102. For example, one or more user-selectable input areas can be provided to a side or back surface of the enclosure 102.

Embodiments described herein relate generally to providing feedback to a user to guide a user input to a user-selectable input area (e.g., user-selectable input area 108). The feedback can be any suitable type of feedback, including tactile feedback, auditory feedback, olfactory feedback, visual feedback, and combinations thereof. The feedback may be provided in response to a touch event occurring outside of a boundary of the user-selectable input area. Additionally or alternatively, feedback can be produced proactively when a user is expected to provide a user input to the user-selectable input area. For example, a user can be expected to apply a force (e.g., a press) to the user-selectable input area based on an application program running on the electronic device. A processing device can cause one or more feedback devices to provide feedback to the user to alert the user to the expected user input, to alert the user to a location of the user-selectable input area, to alert a user to a distance to the user-selectable input area, and/or to guide the user input to the user-selectable input area.

Additionally, in some embodiments, the active area associated with a user-selectable input area (e.g., user-selectable input area 108) can be adjusted to recognize user inputs at locations outside a boundary of the user-selectable input area and associate the user inputs with the user-selectable input area (e.g., user-selectable input area 108 and boundary 110).

FIGS. 1B-1E show various techniques for providing feedback to guide a user input to the user-selectable input area 108 illustrated in FIG. 1A. Embodiments are described herein in conjunction with providing haptic feedback (e.g., tactile feedback) to a user to direct a user to an input area. However, any suitable type of feedback can be used to direct a user input to the user-selectable input area 108. For example, audio feedback and/or visual feedback can be provided in addition to, or as an alternative to, the tactile feedback.

Figure 1B:
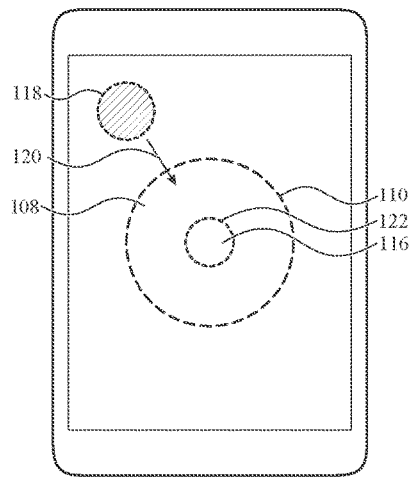
FIG. 1B shows an example of a user input that can be guided to the user-selectable input area shown in FIG. 1A.

FIG. 1B shows an example a user input that can be guided to the user-selectable input area shown in FIG. 1A. A feedback area 116 is included within the boundary 110 of the user-selectable input area 108. When a user input (e.g., touch input) is received outside of the boundary 110, such as at location 118, tactile feedback can be provided in the feedback area 116 to direct the user input to the user-selectable input area 108 (guiding user input represented by arrow 120). Additionally or alternatively, when a user is expected to provide a user input to the user-selectable input area 108, tactile feedback may be provided at the feedback area 116 proactively to alert a user to the expected user input, to alert the user to a location of the user-selectable input area 108, to alert a user to a distance to the user-selectable input area 108, and/or to guide a user input to the user-selectable input area 108. For example, a user can be expected to apply a force (e.g., a press) to the user-selectable input area 108 based on an application program running on the electronic device 100. A processing device (e.g., 1002 in FIG. 10) can cause one or more tactile feedback devices (e.g., 1020 in FIG. 10) to provide tactile feedback to a user-selectable input area 108 and/or to one or more areas or surfaces outside of the user-selectable input area 108.

In one example embodiment, tactile feedback having a longer duration may be produced when a user input is farther from the user-selectable input area 108 and tactile feedback having a shorter duration may be produced when a user input is closer to the user-selectable input area 108. In this manner, the duration of the tactile feedback is associated with the distance from the user-selectable input area 108.

In another example embodiment, tactile feedback having a lower frequency may be produced when a user input is moving toward the user-selectable input area 108 and tactile feedback having a higher frequency may be produced when a user input is moving away from the user-selectable input area 108. In such embodiments, the frequency of the tactile feedback is associated with guiding a user input toward the user-selectable input area 108.

The tactile feedback may be the result of haptic output produced by one or more haptic devices. The haptic output can be a force, movement, and/or a vibration that may be detected by a user as tactile feedback. The haptic output can produce planar movement (movement in the plane of the cover layer 106) and/or vertical movement (movement normal to the surface of the cover layer 106). In one embodiment, the haptic output creates vertical movement in the cover layer 106.

In some embodiments, the haptic output may be applied continuously or at select times to the entire feedback area 116, to a portion of the feedback area 116, or at the boundary 122 of the feedback area 116. The haptic output can continue until an object touching the cover layer 106 (e.g., a finger, a stylus) contacts or crosses the boundary 110. Alternatively, the haptic output can be produced until a user input (e.g., a press) is received within the user-selectable input area 108. When the haptic output is provided at select times, the frequency of the haptic output can be fixed or variable. For example, the frequency of the haptic output can increase as the touch input moves closer to the user-selectable input area 108.

Additionally, in some embodiments, one or more characteristics of the haptic output can vary over time and/or as the user input moves closer to the user-selectable input area 108. The characteristics of the haptic output include, but are not limited to, a frequency, a magnitude (e.g., amplitude), and a duration. For example, the frequency of the haptic output can increase as the user input moves closer to (or away from) the boundary 110 of the user-selectable input area 108. Additionally or alternatively, the duration of the haptic output can decrease as the user input moves closer to (or away from) the boundary 110 of the user-selectable input area 108.

Figure 1C:
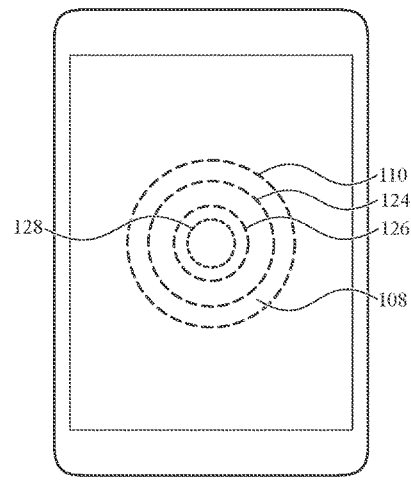
FIG. 1C depicts example feedback zones included in the user-selectable input area shown in FIG. 1A.

In some embodiments, two or more feedback areas or zones can be created within the boundary 110 of the user-selectable input area 108. As shown in FIG. 1C, three feedback areas 124, 126, 128 are included within the boundary 110 of the user-selectable input area 108. Although the user-selectable input area 108, the boundary 110, and the feedback areas 124, 126, 128 are depicted as circular, the user-selectable input area 108, the boundary 110, the feedback area 124, the feedback area 126, and/or the feedback area 128 may each have any given shape and/or dimensions.

When a user input is to be directed to the user-selectable input area 108, haptic output can be provided in one or more of the feedback areas 124, 126, 128. For example, haptic output may only be produced in the feedback area 124 until the user input is at a first distance from the center of the user-selectable input area 108. Thereafter, haptic output may be produced only in the feedback area 126 until the user input is at a closer second distance from the center of the user-selectable input area 108. Finally, haptic output may be produced only in the feedback area 128 until the user input is within the user-selectable input area 108.

In some embodiments, one or more characteristics of the haptic output can differ between the feedback areas 124, 126, 128. The characteristics of the haptic output include, but are not limited to, a frequency, a magnitude (e.g., amplitude), and a duration. For example, the frequency of the haptic output can increase as the user input moves closer to the boundary 110 of the user-selectable input area 108. Additionally or alternatively, the duration of the haptic output can decrease as the user input moves closer to (or away from) the boundary 110 of the user-selectable input area 108.

Additionally or alternatively, the haptic output can move inward from the boundary of the feedback area 124 to the boundary of the feedback area 126 to the boundary of the feedback area 128 to indicate to a user the direction a user input needs to move to reach the center of the user-selectable input area 108. In other words, the haptic output can home in on the center of the user-selectable input area 108.

Further, in some embodiments, the haptic output can be created throughout an entire feedback area 124, 126, 128. In other embodiments, the haptic output may be provided in one or more sections of a feedback area 124, 126, 128. The one or more sections can each have any given shape and dimension.

As yet another option, various combinations of haptic output can be produced in the feedback areas 124, 126, 128. For example, haptic output can be created throughout the entire feedback area 124, in a first section of the feedback area 126, and in a different second section of the feedback area 128.

Figure 1D:
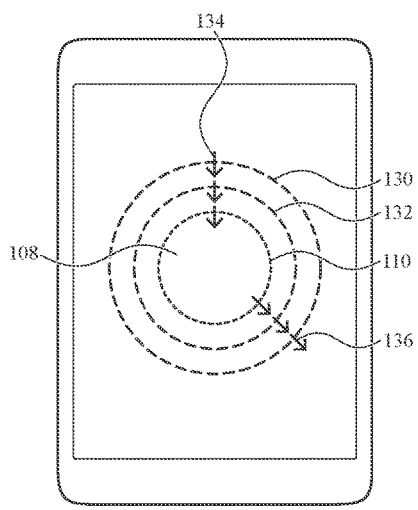
FIG. 1D shows example feedback zones outside the user-selectable input area shown in FIG. 1A.

FIG. 1D shows example feedback zones outside the user-selectable input area shown in FIG. 1A. Only two feedback areas 130, 132 are shown FIG. 1D. Other embodiments can include one or more feedback areas outside of a user-selectable input area 108. Additionally, each feedback area 130, 132 can have any given shape and/or dimensions.

In some embodiments, haptic output can be produced only when the user input is moving in one direction. For example, haptic output can be provided only when the user input is moving closer to the user-selectable input area 108 (indicated by arrows 134). In such embodiments, haptic output may not be produced when the touch event is moving away from the user-selectable input area 108 (indicated by arrows 136).

In some embodiments, haptic output having a first set of characteristics (e.g., frequency, magnitude, duration) can be provided when the touch event is moving in one direction (e.g., closer to the user-selectable input area 108) while haptic output having a different second set of characteristics may be produced when the user input is moving in a second direction (e.g., away from the user-selectable input area 108). For example, haptic output having a first magnitude can be generated when a user input is moving closer to the user-selectable input area 108 while haptic output having a different second magnitude can be generated when a touch event is moving away from the user-selectable input area 108. In this manner, characteristics of the haptic output can be associated with guiding a user input toward the user-selectable input area 108.

Additionally or alternatively, one or more characteristics of the haptic output may vary as a user input crosses a boundary into a feedback area 130, 132. For example, haptic output having a first duration can be generated when a user input crosses into the feedback area 130, and haptic output having a different second duration can be generated when a user input moves into the feedback area 132. In such embodiments, the duration of the haptic output may be associated with guiding the user input toward the user-selectable input area 108. For example, the duration of the haptic feedback can become shorter as the user input moves closer to the user-selectable input area 108.

In some embodiments, the active area of the user-selectable input area 108 can be adjusted to receive user inputs. As described earlier, the active area is the region in which a user input intended for a user-selectable input area or user-selectable input element is recognized and associated with the user-selectable input area. For example, in FIG. 1B, the active area of the user-selectable input area 108 can be the feedback area 116. In FIG. 1C, the active area may be the feedback area 128, and in FIG. 1D, the active area can be the region or space within the boundary 110.

Figure 1E:
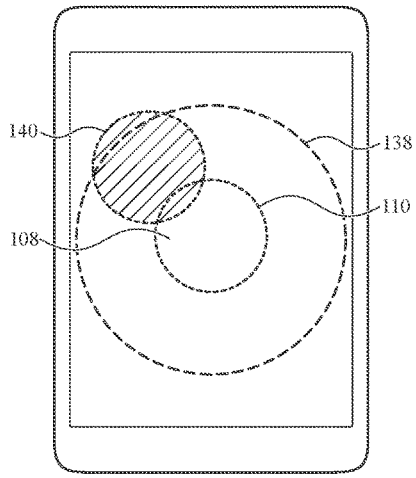
FIG. 1E depicts an example adjusted active area for the user-selectable input area shown in FIG. 1A.

FIG. 1E depicts an example adjusted active area for the user-selectable input area shown in FIG. 1A. Initially, the active area (e.g., default size) is the region within the boundary 110. The adjusted active area 138 is larger than the user-selectable input area 108 and surrounds the input area 108 such that the entire user-selectable input area 108 is within the adjusted active area 138. In other embodiments, an adjusted active area can include only a portion of a user-selectable input area. For example, the adjusted active area 138 can be expanded to include only half of a user-selectable input area 108. A user input that is detected in the adjusted active area 138 (or at least partially within the adjusted active area 138) can be recognized and associated with the user selectable input area 108.

An adjusted active area can have any given shape and/or dimensions. A touch event 140 can be recognized and associated with the user-selectable input area 108 when the touch event 140 (or a portion of the touch event 140) is detected in the adjusted active area 138.

The active area can be adjusted based on several factors. A particular user may submit one or more user inputs (e.g., touch and/or force inputs) outside of the boundary 110 of the user-selectable input area 108. Once a sufficient number of such inputs is received, or when a sufficient number is received within a given time period, the active area may be expanded or moved to include the region in which the user submits his or her inputs. Additionally or alternatively, a processing device can receive output signals from one or more sensors in the electronic device that provide data on the orientation of the electronic device and/or the location of the user-selectable input area 108. The active area may be adjusted based on the orientation of the electronic device (e.g., landscape or portrait orientation) and/or the location of the user-selectable input area. As yet another option, a user may create a user profile that specifies which active areas are to be adjusted. For example, the user can select different application programs in which an active area is to be adjusted.

In some embodiments, adjustment of an active area can be accomplished via software, hardware, or a combination thereof. For example, in some embodiments, multiple sensors may be configured to detect user inputs. The sensors can be any suitable type of sensor or sensors. In a non-limiting example, a capacitive touch-sensing device or layer can include multiple capacitive sensors. Each capacitive sensor may be formed by two electrodes that are aligned in at least one direction (e.g., vertically) but separated by an air gap or by a deformable or compliant material. A subset of sensors in the multiple sensors can form an input element or area. When a touch event is detected by one or more sensors outside of the subset of sensors, a processing device can adjust the active area (e.g., increase the active area) by associating a second subset of sensors in the multiple sensors with the first subset of sensors. Collectively, the first and second subsets of sensors form the adjusted active area. The touch event can be recognized and associated with the input element when at least one sensor in the second subset of sensors or in the first subset of sensors detects the touch event.

As discussed earlier, the haptic output can be provided to alert a user to a user-selectable input element, to guide a user input to the user-selectable input area, to alert a user to an adjusted active area of a user-selectable input element, and/or to guide a touch event to an adjusted active area of the input element. The user-selectable input element can be displayed on a touchscreen display, positioned below a portion of an enclosure of the electronic device, and/or associated with an I/O device coupled to, or within, the electronic device (e.g., a trackpad, a physical button).

As described earlier, a user-selectable input element can be displayed on a touchscreen display, positioned below a portion of an enclosure of an electronic device, and/or included in an input device coupled to, or included within, an electronic device (e.g., a trackpad, a physical button). One embodiment of a display that is configured to detect touch and/or force inputs and provide feedback will now be described.

Figure 2A:
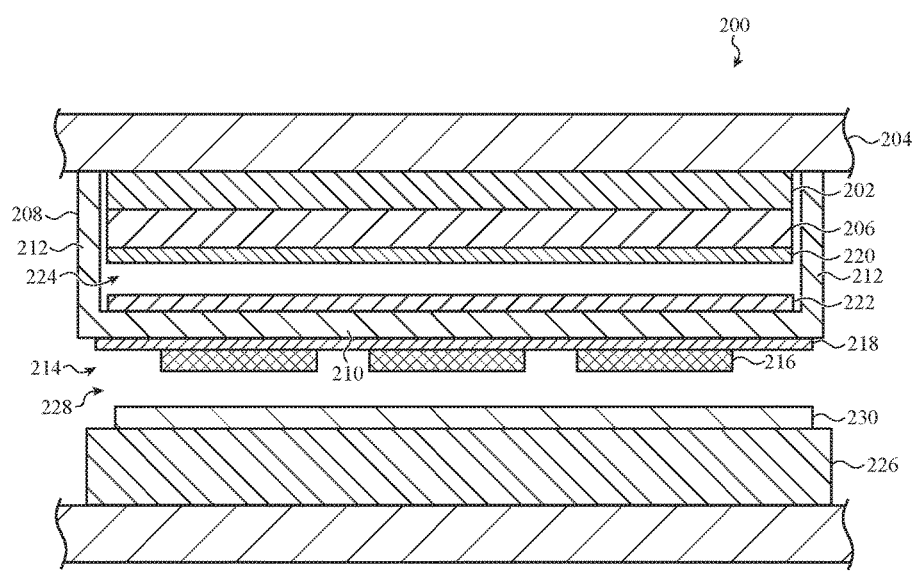
FIG. 2A shows a cross-sectional view of a display that is suitable for use in the display shown in FIGS. 1A-1E when the haptic actuators are in a rest state.
Figure 2B:
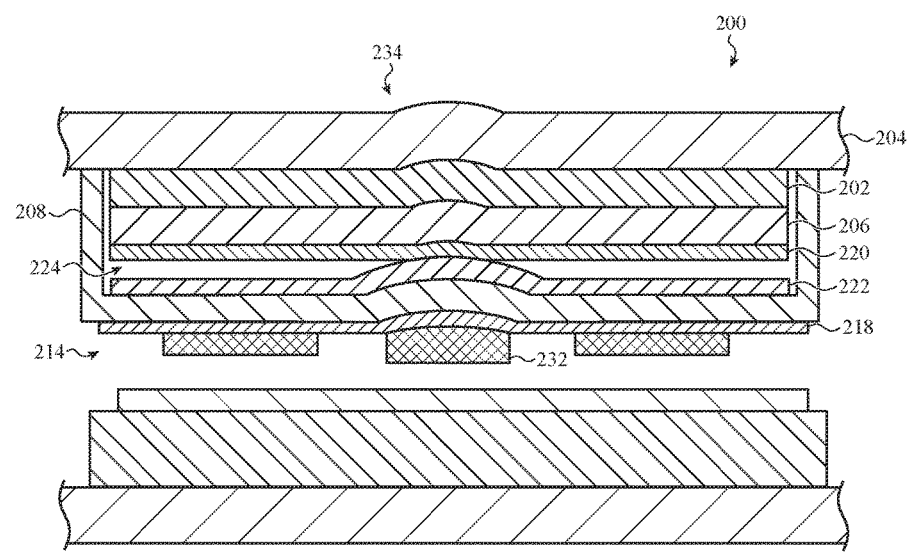
FIG. 2B depicts a cross-sectional view of the display when one haptic actuator is activated to provide haptic output.

FIGS. 2A-2B illustrate a cross-sectional view of one example of a display that is suitable for use as the display shown in FIGS. 1A-1E. FIG. 2A shows the display 200 when the haptic devices or actuators 216 are in a rest state, and FIG. 2B depicts the display 200 when a haptic actuator is activated to provide localized haptic output. In the illustrated embodiments, a touch-sensing device or layer 202 is positioned below a cover layer 204. The touch-sensing device 202 is configured to detect user inputs (e.g., touch inputs, force inputs) on the cover layer 204. In this manner, the cover layer 204 acts as an input surface for the touch-sensing device 202.

Any suitable touch-sensing device or layer 202 can be used. For example, in one embodiment, the touch-sensing device 202 is configured as a capacitive touch-sensing device. Other embodiments can use a different type of touch-sensing technology, including, but not limited to, resistive, ultrasonic, infrared, and surface acoustic wave touch-sensing devices or layers.

In some embodiments, the touch-sensing device 202 includes multiple sensors that are each configured to detect user inputs. For example, a capacitive touch-sensing device can include an array of capacitive sensors. A processing device can be configured to dynamically associate a subset of sensors in the array with an input area or element. The processing device may also be configured to adjust the active area of the input element by associating another subset of sensors with the first subset of sensors to produce an adjusted active area.

A display layer 206 is positioned below the touch-sensing layer 202. The display layer 206 includes the display 104, and may include additional layers such as one or more polarizers, conductive layers, adhesive layers, and a backlight unit.

The display 200 can also include a support structure 208. In the illustrated embodiment, the support structure 208 is a U-shaped support structure that includes a support plate 210 and sides 212 that extend from the support plate 210 to the cover layer 204. The support plate 210 is depicted as a substantially horizontal support plate, although this is not required.

The support structure 208 can be made of any suitable material or materials. In one non-limiting example, the support structure 208 is made from a conductive material (e.g., a metal or metal alloy). Other embodiments can form the support structure 208, the support plate 210, and/or the sides 212 with a different material or combination of materials (e.g., plastic or a ceramic). In the illustrated embodiment, the support plate 210 extends along a length and a width of the display layer 206, although this is not required. The support structure 208 and/or the support plate 210 can have any given shape and/or dimensions in other embodiments.

The sides 212 of the support structure 208 can be connected to the cover layer 204 such that the support structure 208 is suspended from the cover layer 204. In other embodiments, the support structure 208 may be connected to a component other than the cover layer 204. For example, the support structure 208 and/or the support plate 210 can be attached to an enclosure of the display 200 (e.g., enclosure 102 in FIG. 1) or to a frame or other support component in the enclosure.

An array 214 of haptic devices or actuators 216 may be affixed, through a circuit layer 218, to a surface of the support structure 208 (e.g., to the support plate 210). Although the array 214 is depicted with three haptic actuators 216, other embodiments are not limited to this number. The array 214 can include one or more haptic actuators 216.

In the illustrated embodiment, each haptic actuator 216 is attached and electrically connected to the circuit layer 218. Any suitable circuit layer 218 can be used. For example, in one embodiment, the circuit layer 218 may be a flexible printed circuit layer or a circuit board. The circuit layer 218 includes signal lines that are electrically connected to the haptic actuators 216. The signal lines can be used to transmit electrical signals to each haptic actuator 216. As will be described in more detail later, the signal lines are used send actuation signals to one or more haptic actuators 216 to selectively actuate one or more haptic actuators 216 to produce a deflection or deflections (e.g., haptic output) in the cover layer 204.

Any suitable type of haptic actuator can be used. For example, in one embodiment, each haptic actuator 216 is a ceramic piezoelectric actuator, such as a lead zirconate titanate actuator. Other embodiments can use a different type of piezoelectric actuator. Example piezoelectric actuators include, but are not limited to, a piezoelectric polymer material such as a polyvinylidene fluoride, a piezoelectric semiconductor material, and a lead-free piezoelectric material such as a potassium-based material (e.g., potassium-sodium niobate).

In the illustrated embodiment, the haptic actuators 216 are actuated with an electrical signal. When activated, each haptic actuator 216 converts the electrical signal into mechanical movement, vibrations, and/or force(s). The mechanical movement, vibrations, and/or force(s) generated by the actuated haptic actuator(s) 216 can be used to produce localized haptic output. When the haptic output is applied to a surface, a user can detect or feel the haptic output and perceive the haptic output as haptic feedback.

Each haptic actuator 216 can be selectively activated in the embodiment shown in FIGS. 2A and 2B. In particular, each individual haptic actuator 216 can receive an electrical signal via the circuit layer 218 independent of the other haptic actuators 216. The haptic output produced by one or more haptic actuators 216 can cause the support structure 208 to deflect or otherwise move. In the illustrated embodiment, the deflection(s) of the support structure 208 can cause the support plate 210 to move upward such that the deflection transmits through the display layer 206 and the touch-sensing layer 202 to the cover layer 204 (see FIG. 2B). The transmitted deflection(s) cause one or more sections of the cover layer 204 to deflect or move and provide localized haptic output on the surface of the cover layer 204. In particular, the cover layer 204 moves or deflects at a location that substantially corresponds to the location of the haptic actuator(s) 216 on the support structure 208.

The support structure 208 is constructed and attached to the cover layer 204 to define a gap 224 between the top surface of the support plate 210 and a bottom surface of the display layer 206. In some embodiments, a first force-sensing component 220 and a second force-sensing component 222 may be positioned within the gap 224. For example, the first force-sensing component 220 can be affixed to the bottom surface of the display layer 206 and the second force-sensing component 222 can be attached to the top surface of the support plate 210. Together, the first and second force-sensing components 220, 222 form a force-sensing device. The force-sensing device can be used to detect an amount of force that is applied to the cover layer 204. As will be described later, the force input can be used in the methods shown in FIGS. 5-7 and 9.

In some implementations, the first force-sensing component 220 represents a first array of electrodes and the second force-sensing component 222 represents a second array of electrodes. The first and second arrays of electrodes can each include one or more electrodes. Each electrode in the first array of electrodes is aligned in at least one direction (e.g., vertically) with a respective electrode in the second array of electrodes to form an array of capacitive sensors. The capacitive sensors are used to detect a force applied to the cover layer 204 through measured capacitances or changes in capacitances. For example, as the cover layer 204 deflects in response to an applied force, a distance between the electrodes in at least one capacitive sensor changes, which varies the capacitance of that capacitive sensor. Drive and sense circuitry can be coupled to each capacitive sensor and configured to sense or measure the capacitance of each capacitive sensor. A processing device may be coupled to the drive and sense circuitry and configured to receive signals representing the measured capacitance of each capacitive sensor. The processing device can be configured to correlate the measured capacitances into an amount of force.

In other embodiments, the first and second force-sensing components 220, 222 can employ a different type of sensor to detect force or the deflection of the first force-sensing component 220 relative to the second force-sensing component 222. In some representative examples, the first and second force-sensing components 220, 222 can each represent an array of optical displacement sensors, magnetic displacement sensors, or inductive displacement sensors.

In some embodiments, one or both force-sensing components 220, 222 can be used to detect one or more touches on the cover layer 204. In such embodiments, the force-sensing component(s) 220, 222 have a dual function in that they are used to detect both touch and force inputs. In such embodiments, the touch-sensing device 202 may be omitted.

In some embodiments, a battery 226 is positioned below the support structure 208. The battery 226 provides power to the various components of the display 200. The battery 226 can be positioned such that a gap 228 is defined between the array 214 of haptic actuators 216 and a top surface of the battery 226. A third force-sensing component 230 can be disposed on a top surface of the battery 226. The third force-sensing component 230 may be used to detect a second amount of force. In some embodiments, the amount of force applied to the cover layer 204 may be sufficient to cause the touch-sensing device 202 and the display layer 206 to deflect such that the first force-sensing component 220 traverses into the gap 224 and contacts the second force-sensing component 222. When the cover layer 204 is deflected to a point where the first force-sensing component 220 contacts the second force-sensing component 222, the amount of force detected by the force-sensing device reaches a maximum level (e.g., a first amount of force). The force-sensing device cannot detect force amounts that exceed that maximum level. In such embodiments, the third force-sensing component 230 can detect the amount of force that exceeds the maximum level of the force-sensing device (e.g., a second amount of force) by associating an amount of deflection between the support plate 210 and the third force-sensing component 230. For example, in some embodiments, the third force-sensing component 230 represents one or more electrodes that can be used to measure a change in capacitance between the support plate 210 and the third force-sensing component 230.

FIG. 2B depicts the display 200 when a haptic actuator is activated to provide localized haptic output. In the illustrated embodiment, the haptic actuator 232 in the array 214 has been activated with an electrical signal. The haptic actuator 232 moves (e.g., elongates) in response to the electrical signal, which causes the support structure 208 to deflect. While being deflected, the support plate 210, the circuit layer 218, and the second force-sensing component 222 move into the gap 224 and contact the first force-sensing component 220. The deflection of the support structure 208 propagates through the first force-sensing component 220, the display layer 206, the touch-sensing device 202, and the cover layer 204. In response to the transmitted deflection, the cover layer 204 bends or deflects at a location 234 that substantially corresponds to the location of the haptic actuator 232 on the support structure 208. The cover layer 204 around the deflected location 234 is substantially unaffected by the haptic output produced by the haptic actuator 232. A user can detect the local deflection of the cover layer 204 and perceive the deflection as localized haptic feedback.

It should be noted that FIGS. 2A and 2B are exemplary only. In other examples, the electronic device may include fewer or more components than those shown in FIGS. 2A-8B.

Figure 3:
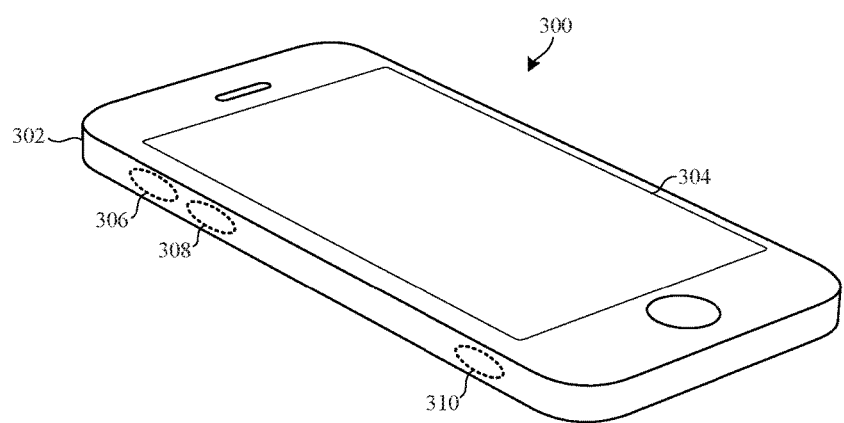
FIG. 3 shows another example electronic device that can include one or more user-selectable input areas.

FIG. 3 depicts another example electronic device that can include one or more user-selectable input areas. The electronic device 300 is depicted as a smart phone, although this is not required. In other embodiments, the electronic device 300 can be a laptop computer, a wearable computing device, a digital music player, headphones, a smart stylus, and other types of input, input/output, accessory, and/or electronic devices.

The electronic device 300 includes an enclosure 302 at least partially surrounding a display 304. The enclosure 302 and the display 304 can be configured similarly to the enclosure 102 and the display 104 shown in FIG. 1A.

One or more user-selectable input areas 306, 308, 310 are disposed below the enclosure 302. In the illustrated embodiment, the user-selectable input areas 306, 308, 310 are positioned on a side of the enclosure 302, although this is not required. One or more user-selectable input areas 306, 308, 310 can be disposed below a back surface of the enclosure 302, a top surface of the enclosure 302 (e.g., user-selectable input area 112 in FIG. 1A), and/or below one or more sides of the enclosure 302.

The user-selectable input areas 306, 308, 310 can receive user inputs that are used to control a function or application of the electronic device 300. For example, the user-selectable input area 306 may receive a user input (e.g., a force input) to increase the volume of audio playback while the user-selectable input area 308 receives a user input (e.g., a force input) to decrease the volume of the audio output or playback.

Additionally or alternatively, the user-selectable input area 310 can receive a user input (e.g., a force input) to provide input to a function or operation of the electronic device 300. For example, a user may apply a user input (e.g., a touch input) to answer a telephone call received by the electronic device 300. In some embodiments, a user can apply a user input (e.g., a force input) to mute an audio device (e.g., a speaker) in the electronic device 300, to open an application program of the electronic device 300 (e.g., a communication program such as email or text), and/or to open a received communication (e.g., email or text).

Additionally or alternatively, feedback can be provided to alert a user to one or more locations of different inputs, to guide a user input to a user-selectable input area, and/or to alert a user to a distance to the user-selectable input area. The feedback can include tactile feedback, auditory feedback, olfactory feedback, visual feedback, and combinations thereof. For example, tactile feedback (e.g., haptic output) having one or more different characteristics (e.g., frequency, duration, magnitude) can be produced to alert a user to one or more locations of different inputs, to guide a user input to a user-selectable input area, and/or to alert a user to a distance to the user-selectable input area. With respect to the electronic device 300, haptic output having a first set of characteristics can be provided to indicate the location of a volume control input element while haptic output having a different second set of characteristics can be provided to indicate the location of a mute input element or an input element to accept a telephone call.

In some embodiments, tactile feedback (e.g., haptic output) having one or more different characteristics (e.g., frequency, duration, magnitude) can be produced to alert a user to a distance of a user-selectable input element. For example, haptic output having a first set of characteristics can be provided to indicate a user input is positioned a first distance from a volume control input element while haptic output having a different second set of characteristics can be provided to indicate the user input is located a different second distance (e.g., closer) from the volume control input element.

As yet another option, feedback having one or more different characteristics (e.g., frequency, duration, volume, intensity) can be produced to alert a user to a location of a user-selectable input element and to a type of input element (e.g., volume control, mute). The feedback can indicate a location to and a distance from a user-selectable input element. In other words, the feedback can indicate or provide different data or information regarding a user-selectable input element.

Figure 4A:
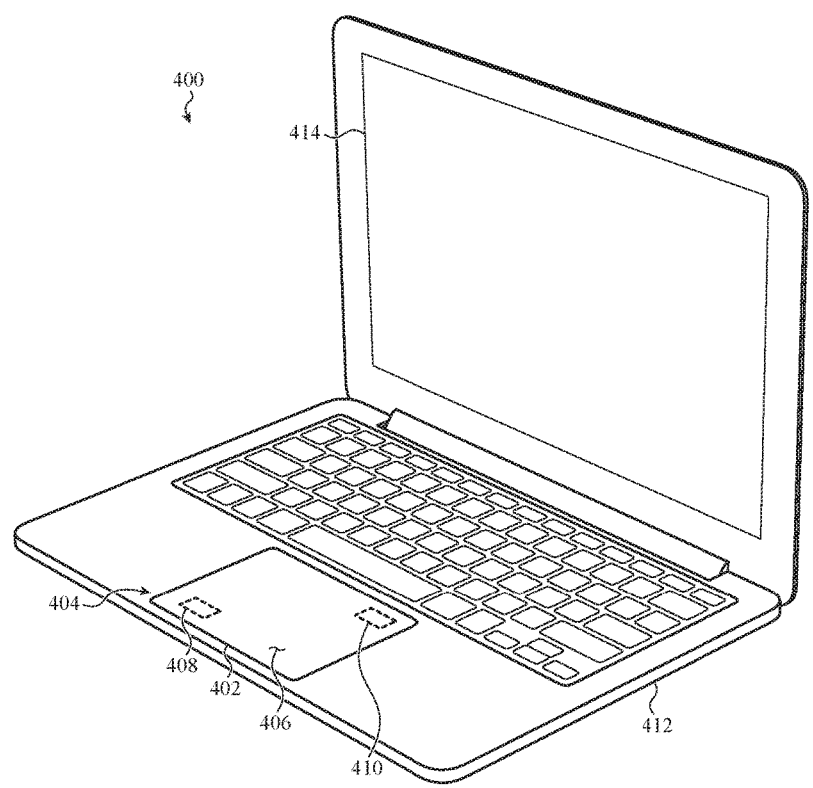
FIG. 4A depicts another example electronic device that has one or more user-selectable input areas.

FIG. 4A shows another example electronic device that includes one or more user-selectable input areas. The electronic device 400 is depicted as a laptop computer, although this is not required. A trackpad 402 is disposed in an aperture 404 defined in the enclosure 412 of the electronic device 400. A cover layer 406 is positioned over the trackpad 402. The cover layer 406 acts as an input surface for the trackpad 402.

In some embodiments, at least a portion of the cover layer 406 and/or the trackpad 402 can depress or deflect when a user presses or applies a force to the cover layer 406. For example, a user may depress or deflect a portion of the trackpad 402 to perform a "click" or a "double click" that selects an icon displayed on the display 414. Additionally or alternatively, in some embodiments, a user can apply a force to the trackpad 402 to submit a force input for an application or function.

In some situations, feedback is provided to a user in response to the user interaction with the trackpad 402. For example, haptic output can be applied to the cover layer 406 based on a touch and/or force input. The haptic output can indicate to the user that the force or touch input is recognized by the electronic device 400.

As described earlier, the haptic output may be a force, movement, and/or a vibration that may be detected by a user as haptic feedback. The haptic output can produce planar movement (movement in the plane of the cover layer 406) and/or vertical movement (movement normal to the surface of the cover layer 406).

One or more user-selectable input elements or input areas 408, 410 can be associated with the trackpad 402. Similar to the embodiments shown in FIGS. 1A-3, feedback can be provided to guide a user input to one or both user-selectable input areas 408, 410. Alternatively, feedback can be generated on the cover layer 406 to assist a user in locating a user-selectable input element (e.g., an icon) on the display 414.

The feedback can be any suitable type of feedback, including tactile feedback, auditory feedback, olfactory feedback, visual feedback, and combinations thereof. Additionally, in some embodiments, the active area associated with the user-selectable input area 408 and/or the user-selectable input area 410 can be adjusted to recognize user inputs that are submitted outside of the boundary of a respective user-selectable input area 408, 410 but are intended for the input area 408, 410. The techniques described in conjunction with FIGS. 5-9 can be used with the trackpad 402.

Additionally or alternatively, feedback may be provided proactively when a user is expected to provide a user input to one or both user-selectable input areas 408, 410. For example, a user can be expected to apply a force (e.g., a press) to the user-selectable input area 408 based on an application program running on the electronic device 400. A processing device (e.g., processing device 1002 in FIG. 10) can cause one or more feedback devices (e.g., feedback device 1018 in FIG. 10) to provide feedback to alert the user (e.g., to the location of the user-selectable input areas 408, 410) and/or to guide the user input to the user-selectable input areas 408, 410. The one or more feedback devices may be a haptic feedback device (e.g., a haptic device) and/or an auditory feedback device (e.g., an audio device).

Figure 4B:
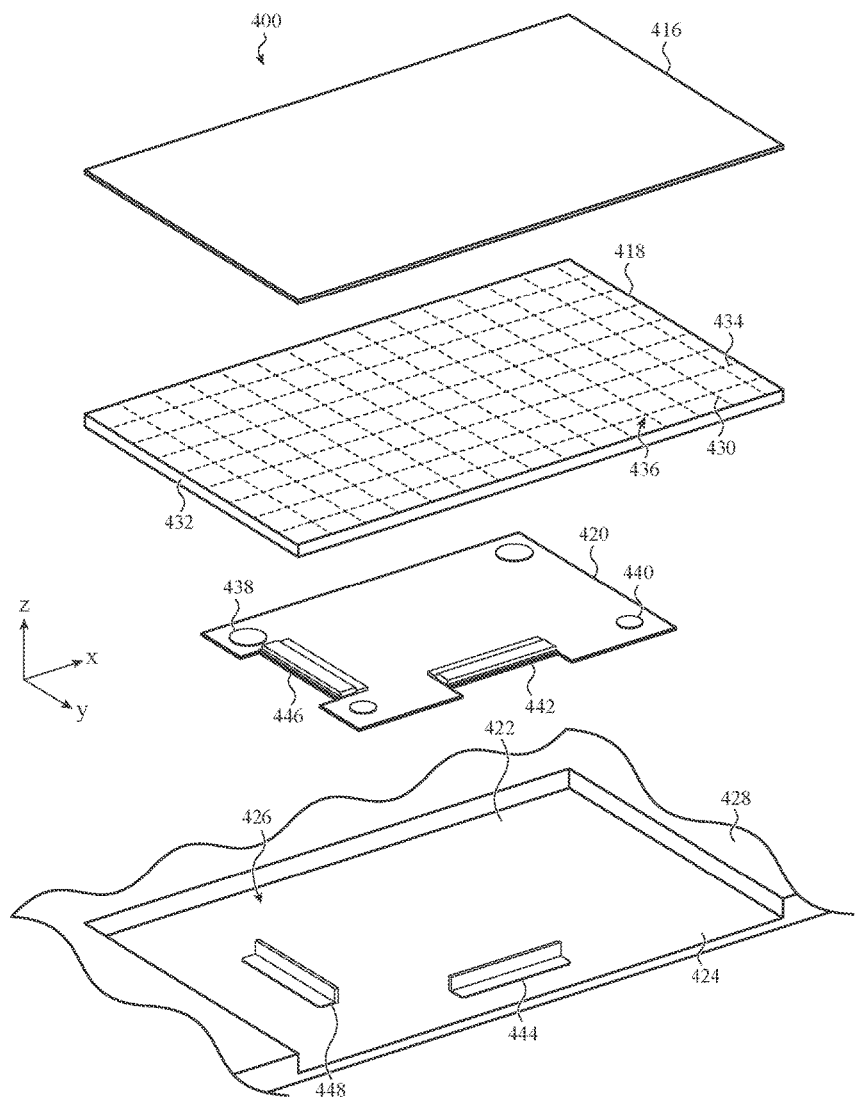
FIG. 4B shows an exploded view of an example trackpad that is suitable for use as the trackpad shown in FIG. 4A.

FIG. 4B shows an exploded view of an example trackpad that is suitable for use as the trackpad shown in FIG. 4A. The trackpad 402 includes an input surface or a cover layer 416, a touch-sensing device 418 positioned below the cover layer 416, input/output (I/O) or circuit board 420 positioned below the touch-sensing device 418, and a support structure 422.

FIG. 4B depicts a top surface 424 of the support structure 422. In some embodiments, the support structure 422 is the bottom surface of a recessed section 426 of the enclosure 428 of an electronic device that includes the trackpad 402. In other embodiments, the support structure 422 can be attached to a surface of the enclosure 428.

The touch-sensing device 418 is configured to detect user inputs or touch events on the input surface or cover layer 416. The touch-sensing device 418 can employ any suitable sensing technology, including, but not limited to, capacitive touch sensing, resistive touch sensing, and ultrasonic touch sensing. In FIG. 4B, the touch-sensing device 418 is a capacitive touch-sensing device. Conductive traces in a first set of conductive traces 430 are arranged along a first dimension of a substrate 432 (e.g., width) and the conductive traces in a second set of conductive traces 434 are arranged along a second dimension of the substrate 432 (e.g., length). Capacitive sensors are formed at the intersections 436 of the first and second sets of conductive traces 430, 434. The capacitive sensors collectively form the touch-sensing device 418. The conductive traces in the first set of conductive traces 430 can be electrically isolated from the conductive traces in the second conductive traces 434 by an interposing insulating or dielectric material.

As described earlier, a subset of the capacitive sensors can form an input element or input area. In some embodiments, when a user input is detected by one or more capacitive sensors outside of the subset of capacitive sensors, a processing device can adjust the active area (e.g., increase the active area) by associating a second subset of capacitive sensors with the first subset of capacitive sensors. Collectively, the first and second subsets of capacitive sensors form the adjusted active area. The user input can be recognized and associated with the input element when at least one sensor in the second subset of sensors or in the first subset of sensors detects the user input.

The I/O or circuit board 420 can include one or more force sensors 438, 440. As will be described later, force inputs detected by the force sensors 438, 440 can be used in the methods shown in FIGS. 5-7 and 9. In one embodiment, the force sensors 438, 440 can be different types of force or displacement sensors. In other embodiments, the force sensors 438, 440 can be the same type of force sensors. Any suitable type of force sensor(s) can be used. Example force sensors include, but are not limited to, eddy current sensors, optical sensors, strain gauges, and/or ultrasonic sensors.

In some embodiments, a first haptic device includes a first electromagnetic actuator 442 attached to the circuit board 420 and a first conductive plate 444 affixed to the support plate or structure 422. The position of the first electromagnetic actuator 442 on the I/O or circuit board 420 corresponds to the position of the first conductive plate 444 on the support structure 422. When the I/O or circuit board 420 and the support structure 422 are attached to one another, the first electromagnetic actuator 442 is located adjacent to the first conductive plate 444.

A second haptic device includes a second electromagnetic actuator 446 attached to the circuit board 420 and a second conductive plate 448 affixed to the support plate or structure 422. Like the first electromagnetic actuator 442 and the first conductive plate 444, the position of the second electromagnetic actuator 446 on the I/O board 420 corresponds to the position of the second conductive plate 448 on the support structure 422. When the circuit board 420 and the support structure 422 are attached to one another, the second electromagnetic actuator 446 is located adjacent to the second conductive plate 448.

The second electromagnetic actuator 446 and the second conductive plate 448 have an orientation that is different from the orientation of the first electromagnetic actuator 442 and the first conductive plate 444. In the illustrated embodiment, the second electromagnetic actuator 446 and the second conductive plate 448 are oriented orthogonally to the first electromagnetic actuator 442 and the first conductive plate 444. This permits haptic output to be provided along different axes.

When haptic output is to be produced to alert a user and/or to guide a user to an input area, an alternating current passes through the first and/or the second electromagnetic actuators 442, 446, which produces time-varying magnetic fields. The time-varying magnetic fields attract and repel the corresponding conductive plates 444, 448 to generate the haptic output. The haptic output can transfer to the cover layer 416 and move or translate the cover layer 416 in one or more directions to provide feedback to a user. In one embodiment, the tactile feedback can guide the user input to a respective user-selectable input element (e.g., user-selectable input element 410). Additionally or alternatively, the tactile feedback may be provided for different purposes. For example, tactile feedback can be provided to alert the user to an adjusted active area for a user-selectable input element (e.g., user-selectable input element 408) and/or to a location of the user-selectable input element (e.g., user-selectable input element 408).

Although the present invention has been described in conjunction with a tablet computing device, a laptop computer, and a smart phone, other embodiments are not limited to these devices. As described earlier, an electronic device can be a wearable computing device, a digital music player, a kiosk, a standalone touch screen display, headphones, a smart stylus, and other types of input, input/output, accessory, and/or electronic devices that have one or more user-selectable input areas.

Figure 5:
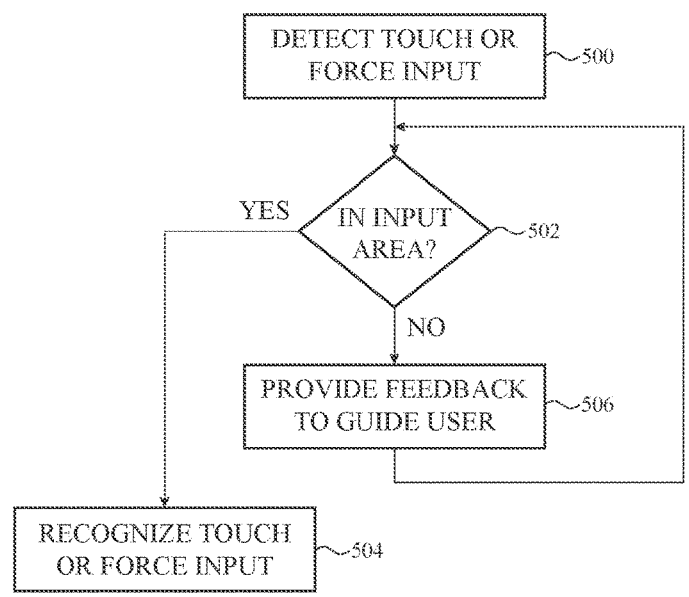
FIG. 5 depicts a flowchart of a first method of guiding a user input to a user-selectable input area.

FIG. 5 depicts a flowchart of a first method of guiding a user input to a user-selectable input area. Initially, as shown in block 500, a user input (e.g., touch or force input) is detected. The user input can be detected using any suitable detection technique. For example, the user input may be detected by a touch-sensing device and/or by one or more sensors in the electronic device (e.g., image sensor).

A determination is made at block 502 as to whether the user input is located within the active area of a user-selectable input area. If so, the method passes to block 504 where the user input is recognized. Recognition of the user input may include generating an input signal that is processed and utilized by other components in the electronic device. For example, a processing device can receive the input signal and associate the input signal with an application program (e.g., selection of an application program or an input to an application program).

When the user input is not situated within the active area of the user-selectable input area, the process continues at block 506 where feedback (e.g., haptic output) is provided to guide the user input to the user-selectable input area. In some embodiments, directing the user input to the user-selectable input area includes tracking the location of the object providing the user input (e.g., a finger, a stylus, or the like) with respect to the user-selectable input area. As discussed earlier, one or more characteristics of the feedback can vary based on the location of the object with respect to the user-selectable input area. Additionally or alternatively, the type or types of feedback may vary based on the location of the object with respect to the user-selectable input area.

In some situations, a combination of feedbacks can be used to guide a user input to a user-selectable input area. For example, in the embodiment shown in FIGS. 4A-4B, the frequency of the haptic output may produce slow movement(s) in the cover layer in the direction(s) the user input must move to reach the input element. Additionally, the duration of the haptic output can generate impulse forces (a force that lasts for a brief period of time) to guide the user input in a particular direction or directions. Thus, the combination of the slow movement of the cover layer and the impulse forces can direct a user input to the input element.

Figure 6:
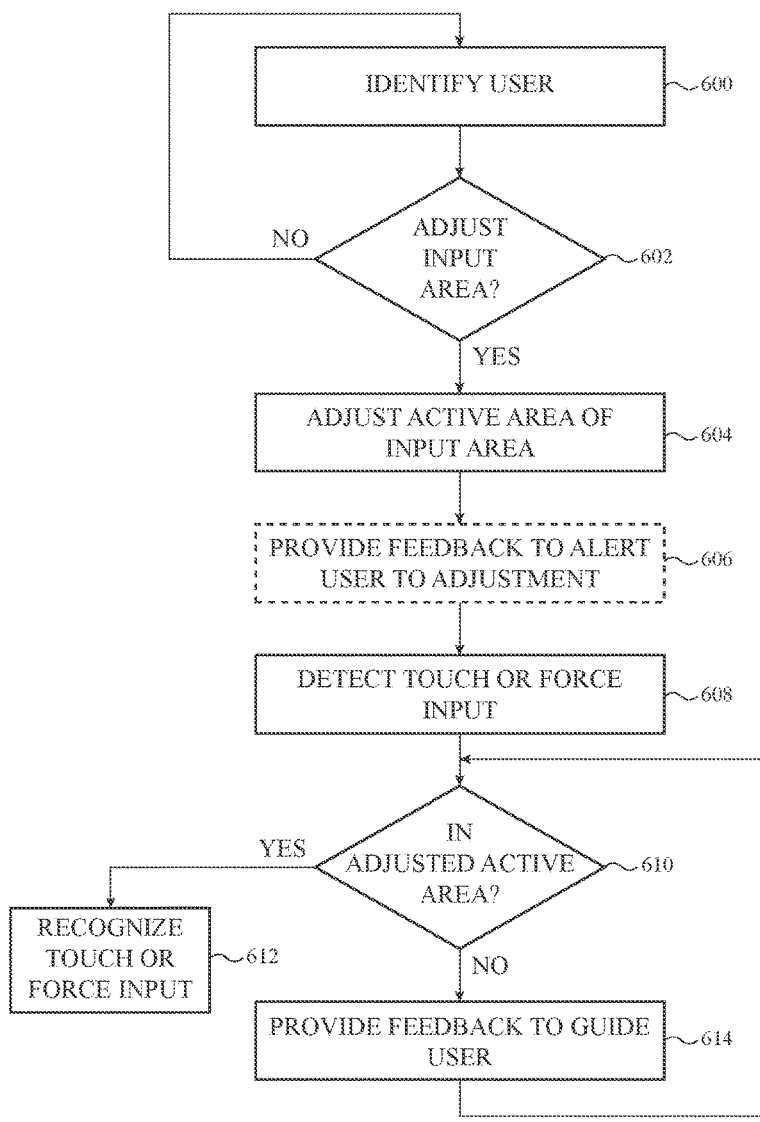
FIG. 6 shows a flowchart of a method of adjusting an active area of a user-selectable input area.

FIG. 6 shows a flowchart of a method of adjusting an active area of a user-selectable input area. FIG. 1E illustrates an adjusted active area for the user-selectable input area 108. As discussed earlier, the active area of a user-selectable input element or area can be adjusted based on several factors. A particular user may submit one or more user inputs (e.g., touch and/or force inputs) outside of the boundary of the user-selectable input area. Additionally or alternatively, a processing device can receive output signals from one or more sensors that provide data on the orientation of the electronic device and/or the position of the user-selectable input area in the electronic device. The active area may be adjusted based on the orientation of the electronic device and/or the user-selectable input element (e.g., landscape or portrait orientation).

Initially, as shown in block 600, a user of an electronic device may be identified. A user can be identified through a variety of techniques. For example, in one embodiment, a user is identified when he or she enters a password to unlock or otherwise access an electronic device, an application program running on the electronic device, and/or a website. In some instances, a user can submit biometric data (e.g., a fingerprint) to unlock or access the electronic device, the application program, and/or the website. Thus, a user can self-identify in some embodiments.

Additionally or alternatively, one or more characteristics of the user's interactions with an electronic device may be used to identify the user. For example, the application programs and/or websites a user accesses can identify the user. In some embodiments, the typing speed, communications (e.g., emails, texts, telephone calls), calendar entries, and/or locations (e.g., via a location services application) may be used to identify a user.

After the user is identified in block 600, a determination is made at block 602 as to whether the active area for a user-selectable input element is to be adjusted based on the identity of the user. For example, a user profile may be associated with the user that specifies which active areas are to be adjusted. In some embodiments, the user can select different application programs in which an active area is to be adjusted and store these selections in a user profile.

The method waits at block 600 if the active area will not be adjusted. When the active area of a user-selectable input element will be adjusted, the process continues at block 604 where the active area of the user-selectable input element is adjusted. In some embodiments, feedback (e.g., haptic feedback) is provided to the user to alert the user to the adjustment of the active area (block 606), although this is not required. Block 606 may be omitted in other embodiments.

A user input (e.g., a touch or force input) is then detected and a determination made as to whether the user input is in the adjusted active area (blocks 608 and 610). If the user input is in the active area, the process passes to block 612 where the user input is recognized and associated with the user-selectable input element. In some embodiments, the user input is recognized and associated with the input element when the user input is partially within the adjusted active area. As described earlier, recognition of the user input may include generating an input signal that is processed and utilized by other components in the electronic device.

If the user input is not in the active area, the method continues at block 614 where feedback is provided to guide the user input to the adjusted active area. The method then returns to block 610 and repeats until the user input is detected in the adjusted active area.

Figure 7:
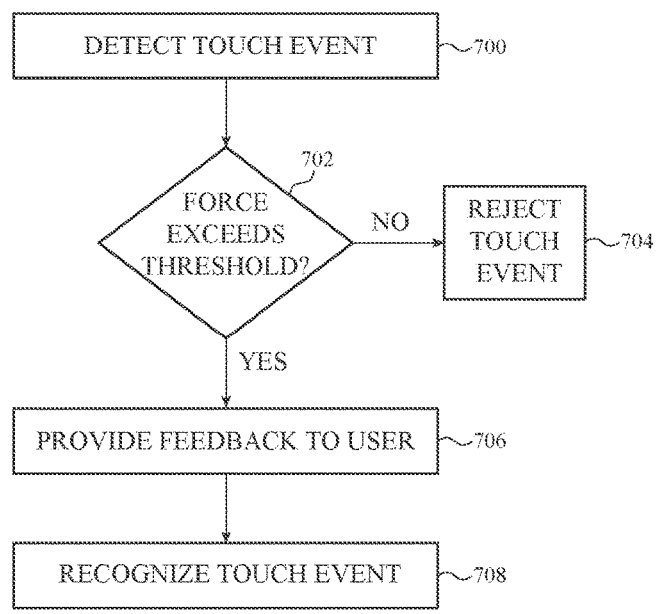
FIG. 7 depicts a flowchart of a first method of indicating a user input is recognized.

In some embodiments, feedback can be provided to a user to indicate a touch event (e.g., touch and/or force input) is recognized. FIG. 7 depicts a flowchart of a method of indicating a user input is recognized. The method allows an electronic device (e.g., a processing device) to reject inadvertent user inputs.

Initially, as shown in block 700, a touch event is detected. A determination is then made at block 702 as to whether the force component of the touch event equals or exceeds a force threshold. If the force component does not equal or exceed the force threshold, the process passes to block 704 where the touch event is rejected.

If the force component of the touch event equals or exceeds the force threshold, the method continues at block 706 where feedback is provided to the user. The feedback can be tactile, auditory, visual, and combinations thereof. The touch event is then recognized, as shown in block 708. As described earlier, recognition of the user input may include generating an input signal that is processed and utilized by other components in the electronic device.

Figure 8:
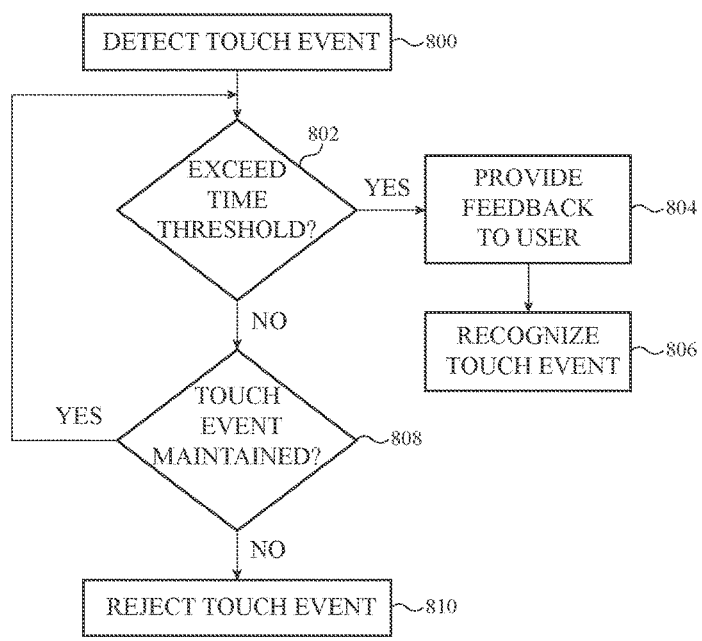
FIG. 8 shows a flowchart of a second method of indicating a user input is recognized.

Other events or factors may be considered when recognizing a touch event. For example, an amount of time a touch event that does not include a force component (e.g., a press) is in contact with (or hovers over) a user-selectable input element can be used to recognize the touch event and associate the touch event with the user-selectable input element. FIG. 8 shows a flowchart of a second method of indicating a touch event is recognized. A touch event is detected and a determination is made as to whether the amount of time the touch event is in contact with (or hovers over) a user-selectable input element equals or exceeds a time threshold (blocks 800 and 802). If so, the process continues at block 804 where feedback (e.g., tactile, auditory, and/or visual feedback) is provided to the user to alert the user to the recognition of the touch event. The touch event is then recognized and associated with the user-selectable input element at block 806.

If the amount of time the touch event is in contact with (or hovers over) a user-selectable input element does not equal or exceed the time threshold, the method passes to block 808 where a determination is made as to whether the contact (or the hovering over) is maintained. In other words, a determination is made as to whether the touch event remains at the same location or at the same user-selectable input element. If so, the process returns to block 802. If the touch event is not maintained, the touch event is rejected at block 810.

Figure 9:
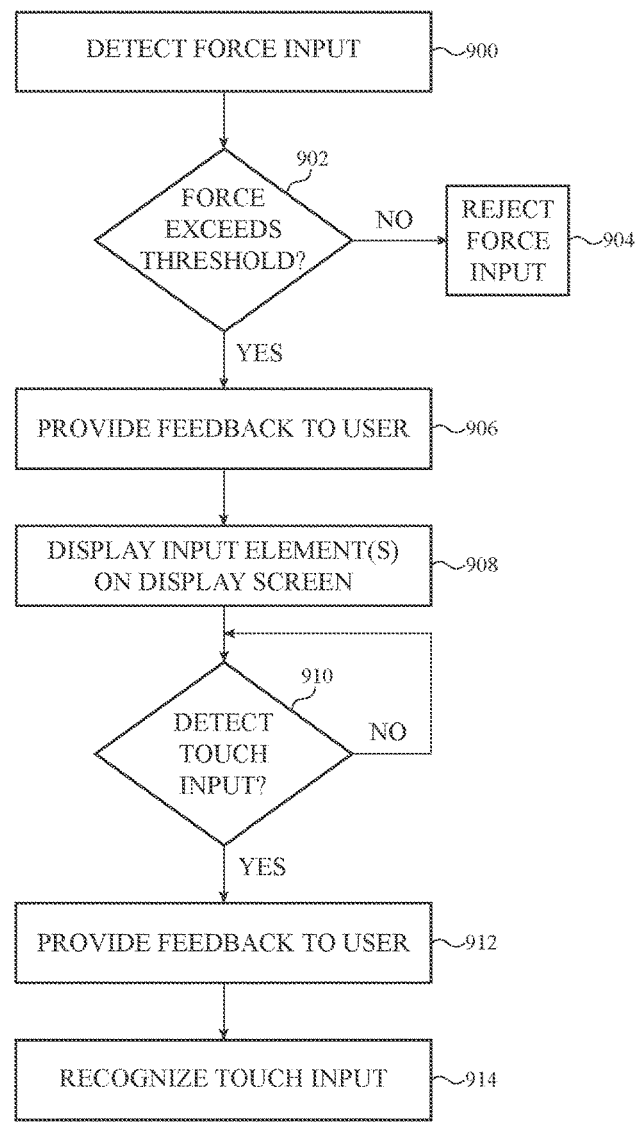
FIG. 9 depicts a flowchart of a third method of indicating a user input is recognized.

In some embodiments, a user may want to present data on a display only after the user has taken an action. For example, some electronic devices may display data in response to an inadvertent touch event, but the user may want to keep the data confidential and present the information only in response to a particular user input. FIG. 9 depicts a flowchart of a third method of indicating a user input is recognized. A force input is detected at block 900 and a determination is made as to whether the force input equals or exceeds a force threshold (block 902). If the force input does not equal or exceed the force threshold, the process passes to block 904 where the force input is rejected.

If the force input equals or exceeds the force threshold, the method continues at block 906 where feedback is provided to the user to indicate the force input is recognized. As discussed earlier, the feedback can be tactile feedback, auditory feedback, visual feedback, olfactory feedback, or combinations thereof. Next, as shown in block 908, data including one or more user-selectable input elements is displayed on the display screen.

A determination is then made at block 910 as to whether a touch input to a user-selectable input element is detected. If not, the method waits at block 910. When a touch input is detected, the process continues at block 912 where feedback is provided to the user to indicate the touch input is recognized. The touch input is then recognized at block 914. As described earlier, recognition of the touch input may include generating an input signal that is processed and utilized by other components in the electronic device.

Figure 10:
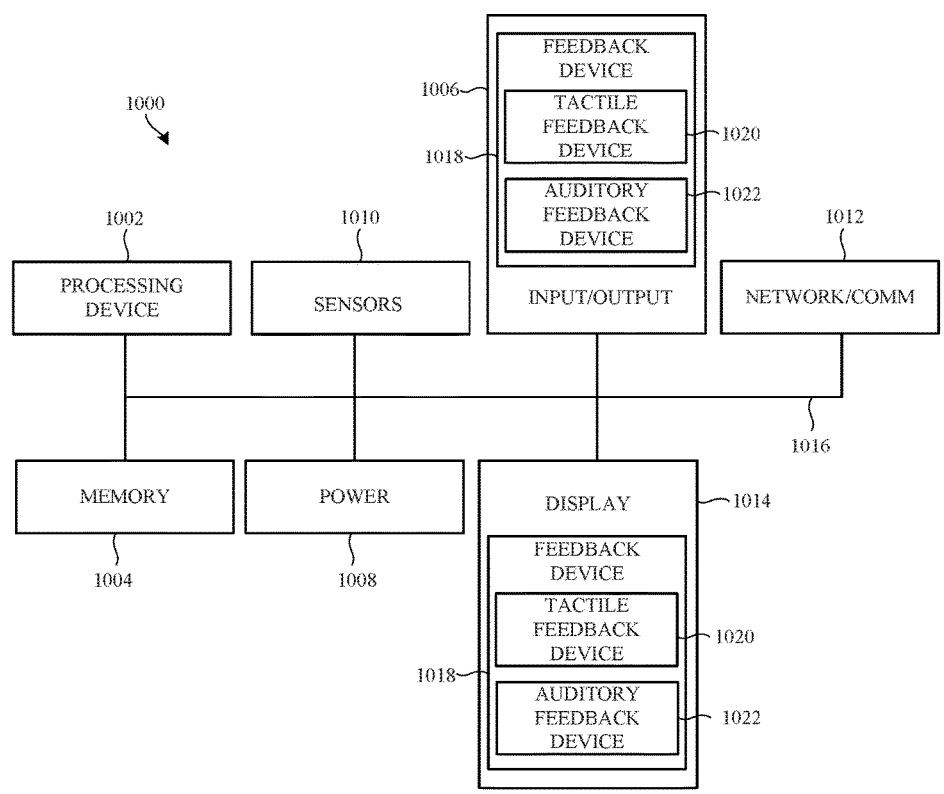
FIG. 10 shows an illustrative block diagram of an electronic device that can include one or more user-selectable input areas.

FIG. 10 shows an illustrative block diagram of an electronic device that can include one or more adaptable user-selectable input areas. The electronic device 1000 can include one or more processing devices 1002, memory 1004, one or more I/O devices 1006, a power source 1008, one or more sensors 1010, a network communication interface 1012, and a display 1014, each of which will be discussed in more detail.

The one or more processing devices 1002 can control some or all of the operations of the electronic device 1000. The processing device(s) 1002 can communicate, either directly or indirectly, with substantially all of the components of the electronic device 1000. For example, one or more system buses 1016 or other communication mechanisms can provide communication between the processing device(s) 1002, the memory 1004, the I/O device(s) 1006, the power source 1008, the one or more sensors 1010, the network communication interface 1012, and/or the display 1014. At least one processing device 1002 can be configured to determine if an active area of a user-selectable input element is to be adjusted and if so, adjust the active area. Additionally or alternatively, the at least one processing device 1002 may be configured to cause one or more feedback devices (e.g., auditory and/or haptic feedback devices) to provide feedback to guide a user input to the input element and/or the adjusted active area.

The processing device(s) 1002 can be implemented as any electronic device capable of processing, receiving, or transmitting data or instructions. For example, the one or more processing devices 1002 can be a microprocessor, a central processing unit (CPU), an application-specific integrated circuit (ASIC), a digital signal processor (DSP), or combinations of multiple such devices. As described herein, the term "processing device" is meant to encompass a single processor or processing unit, multiple processors, multiple processing units, or other suitably configured computing element or elements.

The memory 1004 can store electronic data that can be used by the electronic device 1000. For example, the memory 1004 can store electrical data or content such as audio files, document files, timing and control signals, operational settings and data, user profiles, and image data. The memory 1004 can be configured as any type of memory. By way of example only, memory 1004 can be implemented as random access memory, read-only memory, Flash memory, removable memory, or other types of storage elements, in any combination.

The one or more I/O devices 1006 can transmit and/or receive data to and from a user or another electronic device. Example I/O device(s) 1006 include, but are not limited to, a trackpad, one or more buttons, a microphone, a haptic device, a speaker, and/or one or more feedback devices 1018. Any suitable feedback device(s) can be used. For example, in some embodiments, the feedback device(s) 1018 may include one or more tactile feedback devices 1020 (e.g., haptic device) and/or one or more auditory feedback devices 1022 (e.g., audio device).

Any suitable auditory feedback device 1022 may be used. One example of an auditory feedback device (e.g., an audio device) is a speaker. In some embodiments, an auditory feedback device 1022 can include any device that produces sound when operating (or as a result of operating). For example, an actuator that is configured to move one or more components can produce sound as a result of moving the component(s). In a non-limiting embodiment, an electromagnetic linear actuator may produce different sounds as a result of moving a magnetic mass in the electromagnetic linear actuator. Thus, in some embodiments, an auditory feedback device 1022 may be configured as a tactile feedback device 1020.

Additionally, any suitable tactile feedback device 1020 can be used. For example, in one embodiment, at least one tactile feedback device 1020 may be configured as one or more haptic devices. The haptic device(s) can be configured as the haptic actuators discussed earlier in conjunction with FIGS. 2A-2B. Additionally or alternatively, the haptic device(s) may be configured as the electromagnetic actuators discussed earlier in conjunction with FIG. 4B. Other types of haptic devices include, but are not limited to, piston-type haptic actuators, ultrasonic actuators, and motors.

As one example, the I/O device 105 shown in FIG. 1 may include a tactile feedback device 1020. The tactile feedback device 1020 can generate a haptic output that is perceived by a user as haptic feedback when an object (e.g., a finger) is in contact with the I/O device 105. The haptic feedback can alert a user to an adjusted active area of an input element. Additionally or alternatively, the haptic feedback can be used to guide a touch input to an input element and/or an adjusted active area of an input element.

The power source 1008 can be implemented with any device capable of providing energy to the electronic device 1000. For example, the power source 1008 can be one or more batteries or rechargeable batteries, or a connection cable that connects the electronic device to another power source such as a wall outlet.

The electronic device 1000 may also include one or more sensors 1010 positioned substantially anywhere on or in the electronic device 1000. The sensor or sensors 1010 may be configured to sense substantially any type of characteristic, such as but not limited to, images, pressure, light, heat, force, touch, temperature, humidity, movement, relative motion, biometric data, and so on. For example, the sensor(s) 1010 may be an image sensor, a temperature sensor, a light or optical sensor, an accelerometer, an environmental sensor, a gyroscope, a magnet, a health monitoring sensor, and so on.

As one example, the electronic device 1000 may include a force-sensing device (e.g., first and second force-sensing components 220, 222 in FIG. 2A) in or under at least a portion of the enclosure. Additionally or alternatively, the electronic device 1000 can include one or more force or displacement sensors (e.g., 438 and/or 440 in FIG. 4B).

The network communication interface 1012 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, infrared, RFID, Ethernet, and NFC.

The display 1014 can provide a visual output to the user. The display 1014 can be implemented with any suitable technology, including, but not limited to, a multi-touch sensing touchscreen that uses an LCD element, LED element, OLED element, OEL element, or another type of display element. In some embodiments, the display 1014 can function as an input device that allows the user to interact with the electronic device 1000. For example, the display can include a touch-sensing device that permits the display 1014 to function as a touch or multi-touch display.

In some embodiments, the display 1014 may include one or more feedback devices 1018. Any suitable feedback device(s) 1018 can be used. For example, in some embodiments, the feedback device(s) 1018 can be configured as one or more tactile feedback devices 1020 and/or one or more auditory feedback devices 1022.

It should be noted that FIG. 10 is exemplary only. In other examples, the electronic device may include fewer or more components than those shown in FIG. 10. Additionally or alternatively, the electronic device can be included in a system and one or more components shown in FIG. 10 are separate from the electronic device but in communication with the electronic device. For example, an electronic device may be operatively connected to, or in communication with, a separate display. As another example, one or more applications or data can be stored in a memory separate from the electronic device. In some embodiments, the separate memory can be in a cloud-based system or in an associated electronic device.

As described earlier, any suitable type of feedback or feedback combinations can be provided to a user. The feedback can be tactile feedback, auditory feedback, olfactory feedback, visual feedback, and combinations thereof. Additionally, one or more characteristics of the feedback can vary. For example, the volume and/or frequency of auditory feedback provided to a user can change, or the size, color, and/or intensity of visual feedback may vary.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
a touchscreen display configured to display a user-selectable input area having a size, the touchscreen display comprising a touch-sensing layer positioned below an input surface of the electronic device and defining an active area that corresponds to the displayed user-selectable input area;
a feedback device; and
a processing device coupled to the touchscreen display and to the feedback device, the processing device configured to:
recognize a first touch detected in the active area as a first input to the displayed user-selectable input area;
cause the feedback device to provide a first feedback in response to the first touch;
modify the active area to create an adjusted active area that extends beyond the displayed user-selectable input area while maintaining the size of the displayed user-selectable input area;
recognize a second touch detected in the adjusted active area as a second input to the displayed user-selectable input area; and
cause the feedback device to provide a second feedback in response to the second touch.

2. The electronic device of claim 1, wherein:
the feedback device comprises a haptic device; and
the processing device is configured to cause the haptic device to produce a haptic output for the first feedback.

3. The electronic device of claim 1, wherein:
the feedback device comprises an audio device; and
the processing device is configured to cause the audio device to produce an audio output for the first feedback.

4. The electronic device of claim 1, wherein the processing device is further configured to cause the feedback device to provide feedback to guide the second touch to the user-selectable input area.

5. The electronic device of claim 4, wherein:
the feedback device comprises a haptic device; and
the processing device is configured to cause the haptic device to produce a haptic output to guide the second touch to the user-selectable input area.

6. The electronic device of claim 5, wherein the haptic output produces one or more deflections in the input surface that vary with a distance between the second touch and the user-selectable input area.

7. The electronic device of claim 4, wherein:
the feedback device comprises an audio device; and
the processing device is configured to cause the audio device to produce an audio output to guide the second touch to the user-selectable input area.

8. An electronic device, comprising:
a touchscreen display configured to display a user-selectable input area having a size, the touchscreen display comprising multiple sensors that are each configured to detect touch events on a surface of the electronic device, the multiple sensors comprising:
a first subset of the multiple sensors that forms an active area corresponding to the user-selectable input area; and
a second subset of the multiple sensors that forms an adjusted active area comprising an area outside of the displayed user-selectable input area; and
a processing device coupled to the multiple sensors and configured to:
recognize a first touch event detected within the displayed user-selectable input area by at least one sensor of the first subset as a first input to the displayed user-selectable input area; and
recognize a second touch event detected outside of the displayed user-selectable input area by at least one sensor of the second subset as a second input to the displayed user-selectable input area while maintaining the size of the displayed user-selectable input area.

9. The electronic device of claim 8, wherein:
the electronic device comprises:
a cover layer that defines the surface; and
a display layer; and
the multiple sensors are positioned between the cover layer and the display layer.

10. The electronic device of claim 8, wherein:
the electronic device further comprises one or more haptic feedback devices coupled to the processing device; and
the processing device is further configured to cause at least one haptic feedback device to provide haptic feedback to indicate a location of the adjusted active area.

11. The electronic device of claim 8, wherein:
the electronic device further comprises one or more haptic feedback devices coupled to the processing device; and
the processing device is further configured to cause at least one haptic feedback device to provide haptic feedback to indicate a function associated with the displayed user-selectable input area.

12. An electronic device, comprising:
a trackpad assembly configured to display a user-selectable input area and having a size, the trackpad assembly comprising a touch-sensing layer positioned below an input surface of the electronic device and defining an active area corresponding to the displayed user-selectable input area;
a haptic feedback device; and
a processing device coupled to the trackpad assembly and to the haptic feedback device, the processing device configured to:
recognize a first touch detected in the active area as a first input to the displayed user-selectable input area;
modify the active area to create an adjusted active area that extends beyond the displayed user-selectable input area while maintaining the size of the displayed user-selectable input area;
cause the haptic feedback device to provide haptic feedback to indicate the modification of the active area; and
recognize a second touch detected within the adjusted active area but outside of the user-selectable input area as a second input to the displayed user-selectable input area.

13. The electronic device of claim 12, wherein the processing device is further configured to cause the haptic feedback device to provide haptic feedback to indicate a location of the adjusted active area.

14. A method for operating an electronic device, the method comprising:
- detecting a first touch on an input surface of the electronic device;
- determining if a force component of the first input equals or exceeds a force threshold;
- rejecting the first touch if the force component does not equal or exceed the force threshold;
- determining that the first touch is within an active area corresponding to a user-selectable input area displayed at the electronic device, the user-selectable input area having a size;
- recognizing the first touch as a first input to the user-selectable input area;
- modifying the active area to produce an adjusted active area that is different from the active area and extends beyond the displayed user-selectable input area while not altering the size of the displayed user-selectable input area;
- providing a first feedback to a user to alert the user to the modification of the active area;
- providing a second feedback to guide a second touch to the user-selectable input area;
- determining that the second touch is within the adjusted active area; and
- recognizing the second touch as a second input to the displayed user-selectable input area.

15. The method of claim 14, wherein the adjusted active area includes only a portion of the active area.

16. The method of claim 14, further comprising providing a third feedback to the user to indicate a function associated with the user-selectable input area.

17. The method of claim 14, wherein providing the second feedback comprises:
- varying a characteristic of the second feedback as a distance between the second touch and the user-selectable input area changes; and
- combining types of feedback to produce the second feedback as the distance between the second touch and the user-selectable input area changes, the types of feedback comprising tactile feedback, auditory feedback, and visual feedback.

18. The method of claim 17, wherein varying the characteristic of the second feedback as the distance between the second touch and the user-selectable input area changes comprises one of:
- varying the characteristic of the second feedback as the distance between the second input and the user-selectable input area decreases and ceasing the second feedback as the distance between the second touch and the user-selectable input area increases; or
- varying the characteristic of the second feedback as the distance between the second touch and the user-selectable input area decreases and varying another characteristic of the second feedback as the distance between the second touch and the user-selectable input area increases.

* * * * *